US012103001B2

(12) United States Patent
Sarioglu et al.

(10) Patent No.: US 12,103,001 B2
(45) Date of Patent: Oct. 1, 2024

(54) SYSTEMS DEVICES AND METHODS PROVIDING HYDRODYNAMIC BARRIERS

(71) Applicant: Georgia Tech Research Corporation, Atlanta, GA (US)

(72) Inventors: Ali Fatih Sarioglu, Atlanta, GA (US); Dohwan Lee, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 1069 days.

(21) Appl. No.: 16/975,498

(22) PCT Filed: Feb. 27, 2019

(86) PCT No.: PCT/US2019/019862
§ 371 (c)(1),
(2) Date: Aug. 25, 2020

(87) PCT Pub. No.: WO2019/169005
PCT Pub. Date: Sep. 6, 2019

(65) Prior Publication Data
US 2021/0069700 A1 Mar. 11, 2021

Related U.S. Application Data

(60) Provisional application No. 62/635,616, filed on Feb. 27, 2018.

(51) Int. Cl.
*B08B 17/00* (2006.01)
*B01L 3/00* (2006.01)
(Continued)

(52) U.S. Cl.
CPC ........ *B01L 3/50273* (2013.01); *F04B 19/006* (2013.01); *F04B 43/12* (2013.01); *B01L 2400/0475* (2013.01)

(58) Field of Classification Search
None
See application file for complete search history.

(56) References Cited

U.S. PATENT DOCUMENTS 4,562,867 A 1/1986 Stouffer
5,092,578 A * 3/1992 Bergmeier .............. B65H 3/48 271/106

(Continued)

FOREIGN PATENT DOCUMENTS

CN 1849218 A 10/2006
CN 101427060 A 5/2009

(Continued)

OTHER PUBLICATIONS

Search Report and Written Opinion from Application No. PCT/US2019/019862 dated May 16, 2019 (9 pages).

(Continued)

*Primary Examiner* — Paul S Hyun
(74) *Attorney, Agent, or Firm* — Troutman Pepper Hamilton Sanders LLP; Ryan A. Schneider; Dustin B. Weeks

(57) ABSTRACT

A hydrodynamic barrier device including: a plurality of outlets disposed on a surface; a plurality of inlets dispersed among the plurality of outlets and disposed on the surface; and at least one pump in fluid communication with the plurality of outlets and the plurality of inlets, the at least one pump configured to simultaneously pump an operating fluid out of the plurality of outlets and pull the operating fluid back through the plurality of inlets to create a hydrodynamic barrier on the surface.

8 Claims, 18 Drawing Sheets

510

(51) Int. Cl.

| | |
|---|---|
| ***B01L 99/00*** | (2010.01) |
| ***F04B 19/00*** | (2006.01) |
| ***F04B 43/12*** | (2006.01) |

(56) References Cited

U.S. PATENT DOCUMENTS

| | | | |
|---|---|---|---|
| 5,484,267 | A | 1/1996 | Rockwood |
| 6,902,703 | B2 | 6/2005 | Marquiss et al. |
| 7,604,439 | B2 | 10/2009 | Yassour et al. |
| 8,669,119 | B2 | 3/2014 | Segev et al. |
| 9,798,245 | B2 | 10/2017 | Nishii et al. |
| 2006/0180140 | A1 | 8/2006 | Lisec |
| 2007/0195653 | A1 | 8/2007 | Yassour et al. |
| 2010/0150740 | A1 | 6/2010 | Veland |
| 2017/0123326 | A1 | 5/2017 | Ebihara |
| 2017/0128943 | A1 | 5/2017 | Fraden et al. |

FOREIGN PATENT DOCUMENTS

| | | | |
|---|---|---|---|
| CN | 101675251 | A1 | 3/2010 |
| CN | 105627808 | A | 6/2016 |
| WO | 2004114380 | A1 | 12/2004 |

OTHER PUBLICATIONS

Search Report from European Patent Application No. 19760033.1 dated Oct. 25, 2021.

Search Report and Office Action from Chinese Application No. 201980028671X (with translation) dated Dec. 15, 2023.

* cited by examiner

400

SYSTEMS DEVICES AND METHODS PROVIDING HYDRODYNAMIC BARRIERS

PRIORITY CLAIM

This application claims benefit under 35 U.S.C. § 119(e) of U.S. Provisional Patent Application No. 62/635,616, filed Feb. 27, 2018 and entitled "Creating Non-Biofouling Surfaces Through Hydrodynamics," which is incorporated herein by reference in its entirety as if set forth in full, below.

TECHNICAL FIELD

The present disclosure is related to barriers and, more particularly, to systems, devices, and methods for providing hydrodynamic, particle, and bubble surface barriers and systems, devices, and methods for suing the same.

BACKGROUND

Surface properties can drastically affect an item's use and durability. In the related art, passive surface treatments and layers are used to provide hydro-phobic layers, limit biofouling, and/or protect and internal structure of a material. For example, antibiofouling paint (e.g., biocide paint) is used to prevent attachment to hulls of ships. However, such passive coatings can leach into a surrounding environment, which can create, for example, a toxic dead-zone. Alternative passive coatings (e.g., micro/nanostructures, and/or lubricating liquid locked by nanotextured substrates, can resist biofouling. However, these passive coating can neither fully stop biofouling from occurring or reverse biofouling. Meanwhile, related art active macroscale approaches, such as UV exposure and mechanical scraping, are reactive antifouling solutions that require a large amount of power and/or manual labor. Therefore, the related art active antifouling techniques are not practical for large and/or nonplanar surfaces.

Accordingly, there is needed improved options for treating surfaces that is adaptable, can reverse biofouling or otherwise clean a surface, and prevents contamination of an environment. Aspects of the present disclosure are related to these and other features.

SUMMARY

Briefly described, and according to one embodiment, aspects of the present disclosure generally relate to a system including: a plurality of outlets disposed on a surface; a plurality of inlets dispersed among the plurality of outlets and disposed on the surface; and at least one pump in fluid communication with the plurality of outlets and the plurality of inlets, the at least one pump configured to simultaneously pump an operating fluid out of the plurality of outlets and pull the operating fluid back through the plurality of inlets to create a hydrodynamic barrier on the surface.

The device may further include at least one reservoir configured to store at least a portion of the operating fluid.

The device may further include a controller configured to control the pump to operate in a plurality of operating modes.

The plurality of operating modes may include at least one of: an antifouling mode configured to maintain substantial equivalence between a flow rate of the operating fluid through the plurality of outlets and a flow rate the operating fluid through of the plurality of inlets; an injection mode configured to maintain the flow rate of the operating fluid through the plurality of outlets as greater than the flow rate of the operating fluid through the plurality of inlets such that a portion of the operating fluid is released into a surrounding environment; a sampling mode configured to maintain the flow rate of the operating fluid through the plurality of outlets as lesser than the flow rate of the operating fluid through the plurality of inlets such that a portion of environmental fluid is withdrawn from the surrounding environment into the plurality of inlets; and a switching mode configured to modify at least one of the flow rate of the operating fluid through the plurality of outlets and the flow rate of the operating fluid through the plurality of inlets over time.

The switching mode may be configured to switch between the injection mode and the sampling mode.

The operating fluid may include at least one of an emissible fluid, hydrophobic fluid, micro-beads, metallic filings, magnetic material, sterile solutions, solvents, and cleaning solutions.

The plurality of outlets may include an outlet hole array disposed on the surface, and the plurality of inlets may include an inlet hole array disposed on the surface and offset from the outlet hole array.

The plurality of outlets may include a plurality of substantially rectangular outlet trenches disposed on the surface, and the plurality of inlets may include a plurality of substantially rectangular inlet trenches disposed on the surface, the inlet trenches and the outlet trenches being disposed in an alternating pattern.

The plurality of outlets may include a plurality of substantially trapezoidal outlet trenches disposed on the surface, and the plurality of inlets may include a plurality of substantially trapezoidal inlet trenches disposed on the surface, the inlet trenches and the outlet trenches being disposed in an alternating pattern.

The device may further include a plurality of microneedles disposed on the surface, wherein the plurality of outlets and the plurality of inlets are formed in the plurality of microneedles.

Each of the plurality of microneedles may be substantially conical.

The plurality of microneedles may each include a plurality of the plurality of outlets and a plurality of the plurality of inlets.

The at least one pump may include a peristaltic pump.

The operating fluid may be acquired from an environment surrounding the surface.

The plurality of outlets, the plurality of inlets, or both the plurality of outlets and the plurality of inlets may comprise pores in a porous material disposed on the surface.

The porous material may include a hydrogel.

Each of the plurality of outlets may be surrounded by a plurality of the plurality of inlets.

According to some embodiments, there is provided a method including: outputting, through a plurality of outlets disposed on a surface, on operating fluid; and simultaneously with the outputting, withdrawing, through a plurality of inlets disposed on the surface, the operating fluid, thereby creating a hydrodynamic barrier on the surface with the movement of the operating fluid.

The method may further include: selecting an operating fluid from a plurality of operating fluids, the plurality of operating fluids comprising one or more of an emissible fluid, hydrophobic fluid, micro-beads, metallic filings, magnetic material, sterile solutions, solvents, and cleaning solutions; and outputting the selected operating fluid.

The method may further include: selecting an operating mode from among the plurality of operating modes; and maintaining relative flow rates between the plurality of outlets and the plurality of inlets based on the selected operating mode.

The plurality of operating modes may include at least one of: an antifouling mode comprising maintaining substantial equivalence between a flow rate of the operating fluid through the plurality of outlets and a flow rate of the operating fluid through the plurality of inlets; an injection mode comprising maintaining the flow rate of the operating fluid through the plurality of outlets as greater than the flow rate of the operating fluid through the plurality of inlets such that apportion of the operating fluid is released into a surrounding environment; a sampling mode comprising maintaining the flow rate of the operating fluid through the plurality of outlets as lesser than the flow rate of the operating fluid through the plurality of inlets such that a portion of environmental fluid is withdrawn from the surrounding environment; and a switching mode configured to modify at least one of the flow rate of the operating fluid through the plurality of outlets and the than the flow rate of the operating fluid through the plurality of inlets over time.

The switching mode may be configured to switch between the injection mode and the sampling mode.

The method may further include cleaning the surface by altering at least one of an operating fluid, a flow rate of the plurality of outlets, and a flow rate of the plurality of inlets.

The plurality of outlets may include an outlet hole array disposed on the surface, and the plurality of inlets may include an inlet hole array disposed on the surface and offset from the outlet hole array.

The plurality of outlets may include a plurality of outlet trenches disposed on the surface, the plurality of inlets may include a plurality of inlet trenches disposed on the surface, the inlet trenches and the outlet trenches being disposed in an alternating pattern, and the plurality of outlet trenches and the plurality of inlet trenches are substantially rectangular or substantial trapezoidal.

The plurality of outlets and the plurality of inlets may be formed in a plurality of microneedles disposed on the surface.

According to some embodiments, there is provided a barrier device including: at least one outlet disposed on a surface; at least one inlet disposed on the surface; and at least one pump in fluid communication with the at least one outlet and the at least one inlet, the at least one pump configured to simultaneously pump an operating fluid out of the plurality of outlets and pull the operating fluid back through the plurality of inlets to create a hydrodynamic barrier on the surface.

According to some embodiments, there is provided a barrier device including: at least one outlet disposed on a surface; at least one inlet disposed on the surface; and an energy harvesting device configured to draw energy from a relative movement the surface to a surrounding environment to circulate an operating fluid out of the at least one outlet and pull the operating fluid back through the at least one inlet.

According to some embodiments, there is provided a barrier device including: a plurality of pores disposed on a surface; and at least one pump in fluid communication with the plurality of pores, the at least one pump configured to rapidly switch between pumping an operating fluid out of the plurality of pores and pulling the operating fluid back through the plurality of pores to maintain a barrier of the operating fluid on the surface.

The operating fluid may include air, and the barrier may include air bubbles.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
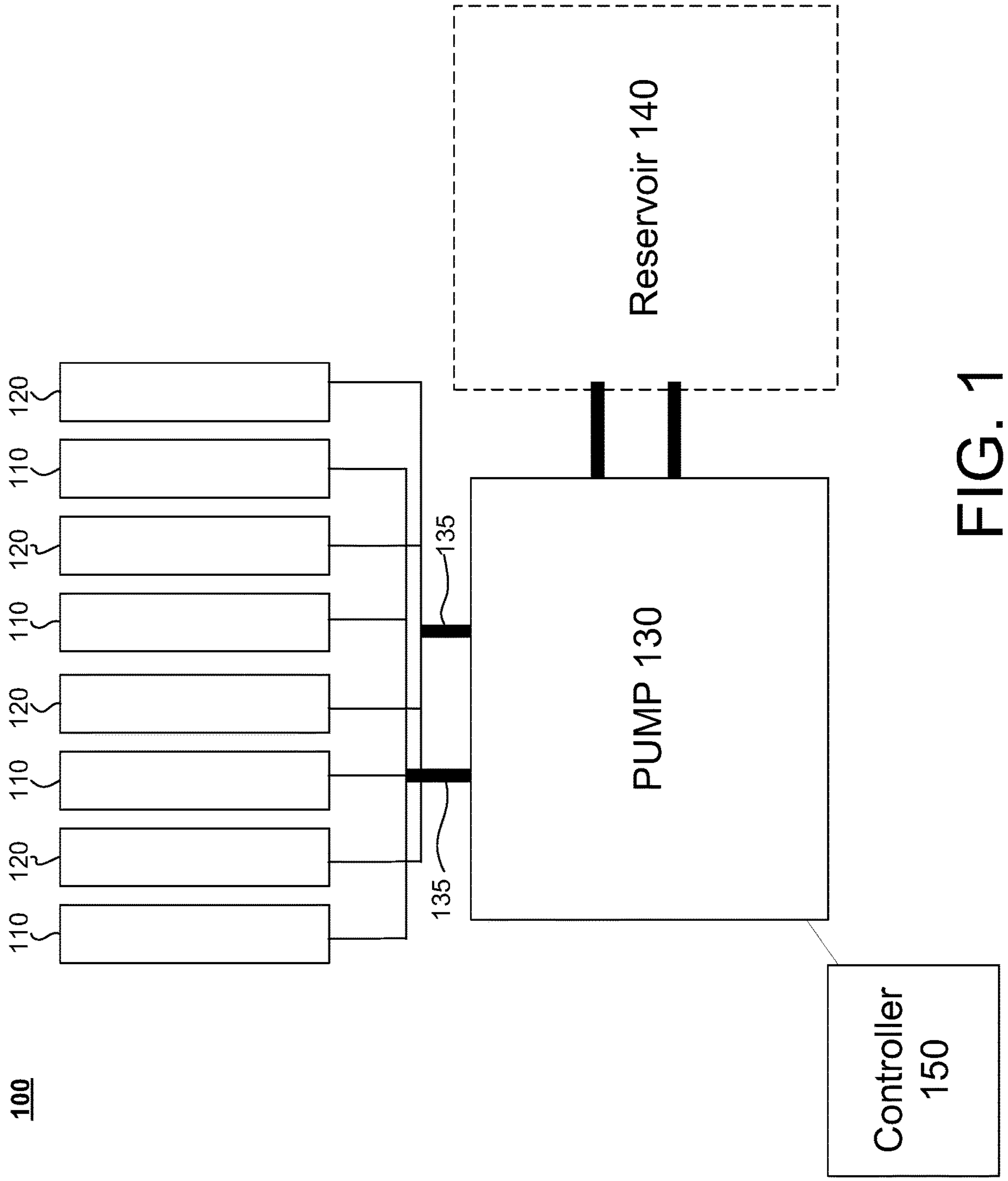
FIG. 1 is a block diagram of a barrier device according to an embodiment.

According to some implementations of the disclosed technology, there is provided a device configured to form a hydrodynamic barrier. The device may include a plurality of outlets (or discharging pores) and inlets (or collecting pores) interspersed with each other. The outflow rate of the outlet may be substantial equal to the inflow rate of the inlets, creating substantial stasis. The circulation of material between the outlets and the inlets may be in the form of a laminar flow that creates a hydrodynamic barrier between a surface of the device and the environment. One or more pumps (e.g., peristaltic pumps) may drive the inlets and outlets.

The material may be provided from one or more reservoirs. The material may include, as non-limiting examples, one or more of an emissible fluid (i.e., not capable of readily mixing with a surrounding environmental fluid), hydrophobic material (e.g., oil), micro-beads, metallic filings, magnetic material, sterile solutions, solvents, and/or cleaning solutions.

In some instances, relative flow of the outlets and inlets may be adjusted to provide for sampling (i.e., by increasing the inlet flow relative to the outlet flow) or to expel material (e.g., by increasing the outlet flow relative to the inlet flow). The sampling may be combined with inline sensors configured to analyze the samples.

Additionally, as will be understood by one of ordinary skill, the presently described techniques are not mutually exclusive with related art approaches. For example, chemical coatings and solutions, UV decontaminations, and filtering may be combined with the presently described barriers.

The inventors faced a number of technical challenges to derive the presently disclosed technology. For example, the effects of ambient current on the hydrodynamic field needed to be mitigated. Inventors discovered running the recirculating buffer under a higher pressure gradient, which minimized the relative effect of the external currents. Additionally, in some cases, the inlets and outlets may be placed in a recessed level with barriers to break the ambient current from disrupting the barrier. If the flow speed forming the barrier is relatively faster than the flow external currents, the barrier can generally be maintained. When an instantaneous strong current is greater than the barrier flow (or within a threshold of the barrier flow), the barrier may collapse, but should generally reestablish itself once the current is lessened. As another issue, surface energy and/or density of the operating fluid may affect the formation of the barrier. For example, when a protective bubble layer is formed on the surface, should remain adherent to the surface rather than floating away. The inventors found that quickly switching between net out (e.g., injection mode) and net in (e.g., sampling mode) helped maintain the surface bubble layer.

Aspects of the present disclosure will now be described with reference to one or more figures. One of ordinary skill will recognize that these descriptions are for illustrative purposes only. Various additions, reductions, modifications, and alternatives will to that explicitly described herein w by one of ordinary skill to be part of the present disclosure.

Figure 10:
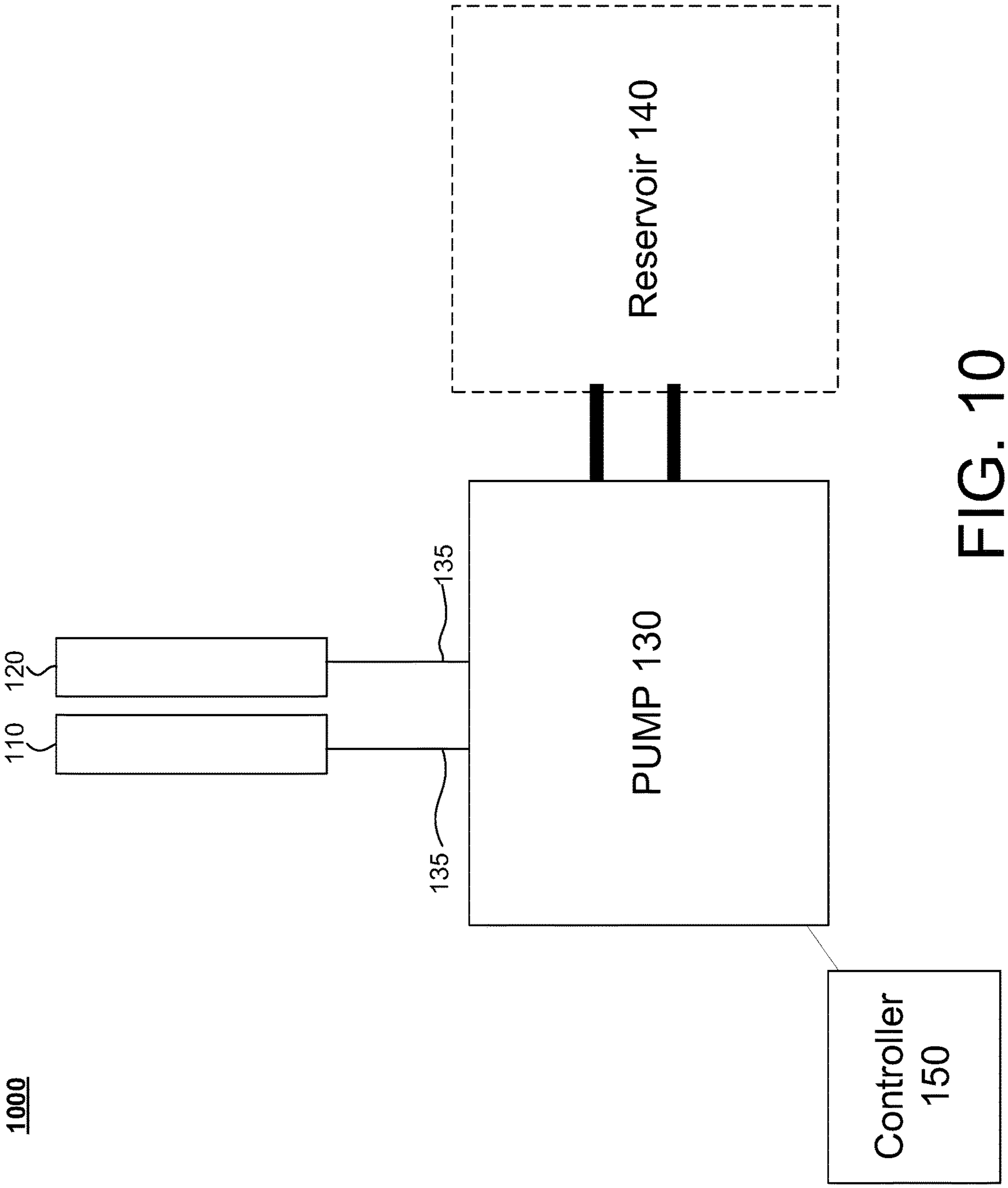
FIG. 10 is a block diagram of a barrier device according to an embodiment.

FIG. 1 is a block diagram of a barrier device 100 in accordance with an example embodiment. Referring to FIG. 1, barrier device 100 includes a plurality of outlets 110, a plurality of inlets 120, pump 130, reservoir 140, and controller 150. Although a plurality of outlets 110 and inlets 120 are illustrated, this is merely an example. As shown in FIG. 10, in some cases, a single outlet 110 and/or a single inlet 120 may be used on a small device to create a hydrodynamic barrier. Micro channels 135 may connect outlets 110 (e.g., discharging pores) and inlets 120 (e.g., collecting pores) to reservoir 140 through pump 130. Outlets 110 and inlets 120 may be formed, as non-limiting examples, as hole arrays, trenches, microneedles, and/or naturally porous materials (e.g., hydrogels). Outlets 110 and inlets 120 will be described below in greater detail with reference to FIGS. 2A-2C, 3A-3C, 4A-4C, and 5A-5F.

Reservoir 140 may hold fluid that is delivered from outlets 110 and suctioned into inlet 120. As non-limiting examples, the fluid may include one or more of hydrophobic material (e.g., oil), micro-beads, metallic filings, magnetic material, sterile solutions, solvents, and/or cleaning solutions. In some cases, barrier device 100 may include a plurality of reservoirs 140, each of which may store a different fluid. One or more switches and/or pumps 130 (e.g., acting under control of controller 150) may select one or more of the reservoirs to output fluid having desired properties. In some instances, reservoir 140 may include a cleaning mechanism to clean fluid from inlets 120. As non-limiting examples, UV radiation, antibacterial material, filtration, and/or heating may be used to clean fluid.

Reservoir 140 may store one or more immiscible fluids as an operating fluid. When operating in a hydrophilic environment, employment of immiscible fluid as an operating fluid further reduces loss of operating fluid caused by, for example, diffusion, tiny defect of device, or spontaneous mismatch of inlet/outlet flow rate. Surficial flowing of immiscible fluid can protect the surface from accumulation of biomolecules.

In some cases, a surrounding environmental fluid such as one or more gases (e.g., air) or liquids (e.g., water) may be used as an operating fluid. In some cases, the environmental fluid may eb filtered and/or cleaned prior to being used as an operating fluid or while be used as an operating fluid. In utilizing an environmental fluid as an operating fluid, the rapid flow of the environmental fluid may provide, for example, biofouling prevention and/or changes to relative friction experienced by the surface in the environment.

In some cases, air or another fluid may be controlled to be gathered on a surface, for example, as a layer of bubbles. Manipulation of bubble formation prevents biomolecules from approaching and adhering to a surface, thus highly completely isolating the surface from the ambient liquid.

Because hydrodynamic barriers may prevent serious leaching into an environment, various chemicals and may be used as an operating fluid that may not be feasible in the related art. For example, if applied to a drug delivery system, therapeutic drugs may be used as an operating fluid. The drugs can locally be loaded in the tissue that has a disease without negatively affecting the surrounding tissue. Similarly, cleaning solutions, detergents, and/or antibiotics may be used as an operating fluid to thoroughly clean a surface.

In some cases, reservoir 140 may include micro/nanoparticles mixed with a fluid to clean the surface. The motion of the small particles may impact the surface and scrub the surface. This can scrape fouling biomaterials. Furthermore, operating fluid throughput (e.g., speed and/or quantity) and direction may be adjusted to move the small particles in particularized directions.

Pump 130 powers the flow of fluid from outlets 110 into inlets 120. Pump 130 may be, for example, a peristaltic pump 130, a syringe pump 130, or a pneumatic pump 130. In some cases, barrier device 100 may include a plurality of pumps 130 that may selectively control respective outlets 110 and/or inlets 120, and/or control the flow of fluid from/to respective reservoirs 140. In some cases, pump 130 may selectively control one or more outlets 110 and/or one or more inlets 120. In certain implementations, pump 130 may be reversible such that a direction of the operating fluid may be reversed (e.g., inlets 120 may output the operating fluid and/or outlets 110 may receive the operating or environmental fluid).

Controller 150 may control pump 130, and various other components of barrier device 100. An example computer architecture that may be used to implement controller 150 is described below with reference to FIG. 8. Controller 150 may control a throughput of fluid from outlet 110 and into inlet 120. For example, by maintaining substantially equal throughput of outlets 110 and inlets 120, a stable hydrodynamic barrier may be retained around barrier device 100. In some cases, controller 150 may relatively increase the throughput of inlets 120 (e.g., by controlling pump 130) to take an environmental sample. In some instances, controller 150 may control only inlets 120 to have an input at a given time. In other cases, the sampling may occur over time. The sample may be tested and/or monitored with sensors, and the controller 150 may adjust operation of the barrier device 100 (e.g., selection of operating fluid or throughput of outlets 110/inlets 120) accordingly. In some circumstances, controller 150 may relatively increase the throughput of outlets 130 in order to emit a portion of the operating fluid.

In certain implementations, controller 150 may selectively alter outlet/inlet 110/120 throughput and/or fluid selection (e.g., reservoir 140 selection) to meet certain requirements. For example, controller 150 may control the throughput and fluid selection to clean a surface of barrier device 100. In some cases, controller 150 may be configured to adaptively clean barrier device 100. For instances, controller 150 may vary fluid selection and throughput based on machine-learning algorithms to effectively clean barrier device 100. Controller 150 may analyze fluid from inlets 120 fluid and/or samples from inlets 120 to determine an effectiveness of various fluid selections and/or throughputs.

As non-limiting examples, controller 150 may operate device 100 in one or more of an antifouling mode, an injection mode, a sampling mode, a stationary mode, and a switching mode. Although these five modes are described, one of ordinary skill will recognize that additional or alternative modes may be created while remaining within the scope of the present disclosure. Moreover, in some implementations, barrier device 100 may not be able to operate in all five modes and/or may only be able to operate in a single mode.

In antifouling mode, the flow rate passing each of outlets 110 is substantially similar to the flow rate passing each of inlets 120; thus the operating fluid discharged by outlets 110 is substantially collected by inlets 120 and the hydrodynamic barrier is formed on the surface. Although a state wherein the flow rate of an operating fluid from the outlets is substantially equivalent to a flow rate of the operating fluid into the inlets is described as an antifouling mode, one of ordinary skill will recognize that, in some cases, injection mode, sampling mode, and/or switching mode may provide some antifouling effects.

In injection mode, the output from the outlets 110 is greater than the flow rate of the inlets 120, thereby discharging fluid outside of the device. In some cases, inlets 120 may be substantially turned off. The injection mode can be used for locally injecting therapeutic substance such as medicine, antibiotic into skin, tissue or blood for medical approaches. In some instances, injection mode may continue to provide a hydrodynamic barrier protecting the surface.

In sampling mode, the flow rate of the inlets 120 is greater than the flow rate of the outlets. In some cases, outlets 110 may be substantially turned off. The sampling mode can be used for collecting sample from any surrounding environment such as blood, tissue fluids, and ocean for continuous, regular, and/or on demand monitoring. In some cases, sampling mode may continue to provide a hydrodynamic barrier protecting the surface.

Furthermore, in a case where material has accumulated on the surface (e.g., biofouling), sampling of the buildup can also occur in any mode (so long as the inlets are activated). For example, operation of the pumps may shear the material from the surface, which can mix in the circulating fluid. In some cases, the sheared material can be used to identify the material to be removed. This sampling process can happen when the inlet and outlet flows are the same or different.

Stationary mode may be a case where the operating fluid is not readily absorbable by the surrounding environment. For example, if the operating fluid is air, after formation of the bubble covering the surface of interest, the external pump substantially stops operation and outlet 110 and inlet 120 flow. The stationary bubble makes air-liquid boundary around the surface and prevents biomolecules in ambient liquid from approaching the surface.

Switching mode rapidly switches relative flow rates of the outlets 110 and inlets 120. For example, switching mode may include rapidly transitioning between injection mode and sampling mode. As an example, by rapidly switching the relative flow rates (e.g., between antifouling and sampling modes), an environmental condition may be monitored digitally and serially. As another example, the rapid transitioning may be used to provide a feedback loop to the device (i.e., to tailor the device operation to a particular environment). In some cases, switching between the modes (e.g., antifouling mode and standby mode) may be used to conserve power. In some cases, switching mode can be used to form or maintain a bubble layer (e.g., of operating fluid such as gas or non-emissive liquid) on the surface. For example, by quickly switching between an injection mode and a sampling mode, air bubbles may be "held" on the surface at an unstable state by preventing them from coalescing and leaving the surface.

One of ordinary skill will recognize that these are merely examples of device operation, and various changes or alternatives will be understood to fall within the scope of the present disclosure.

Figure 2B:
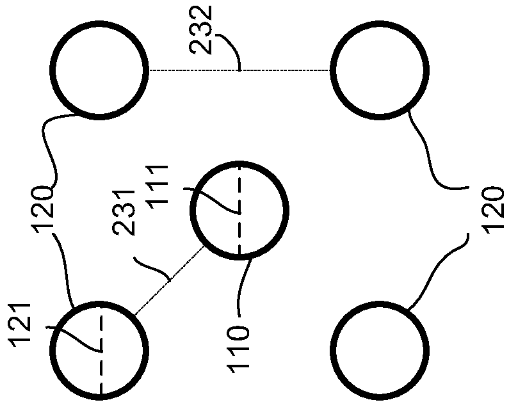
FIGS. 2A-2C illustrate a hole array configuration according to an embodiment.
Figure 2A:
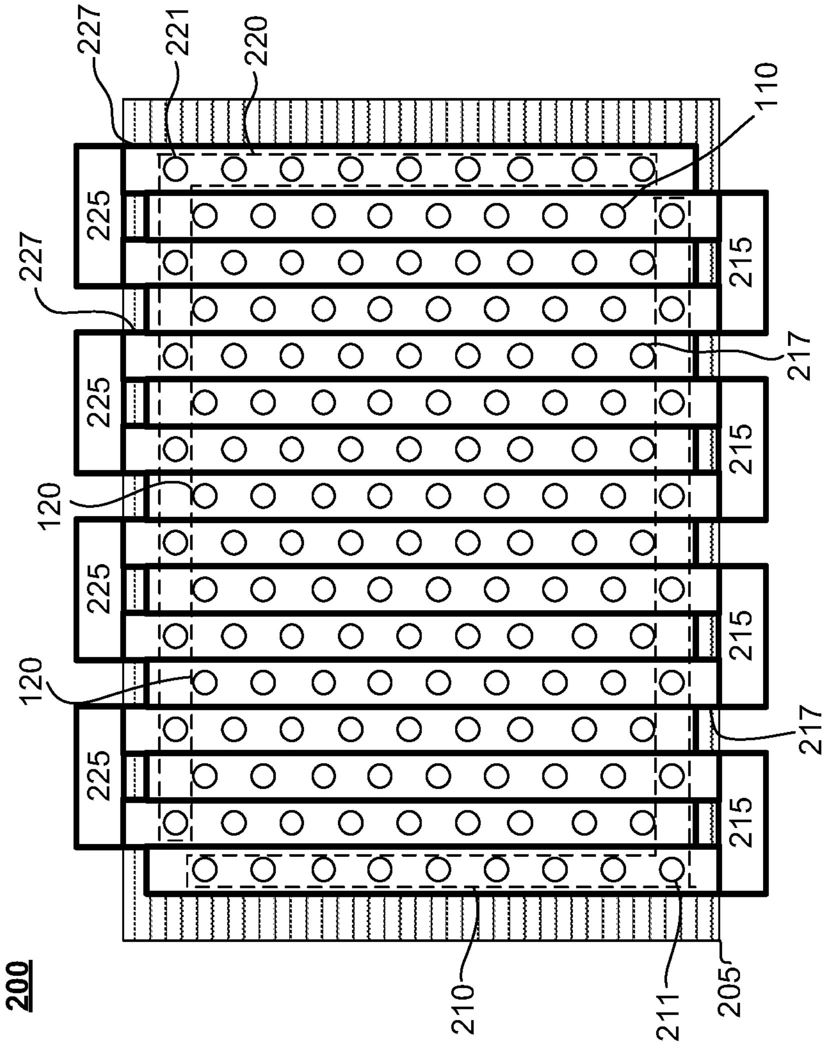
Figure 2C:
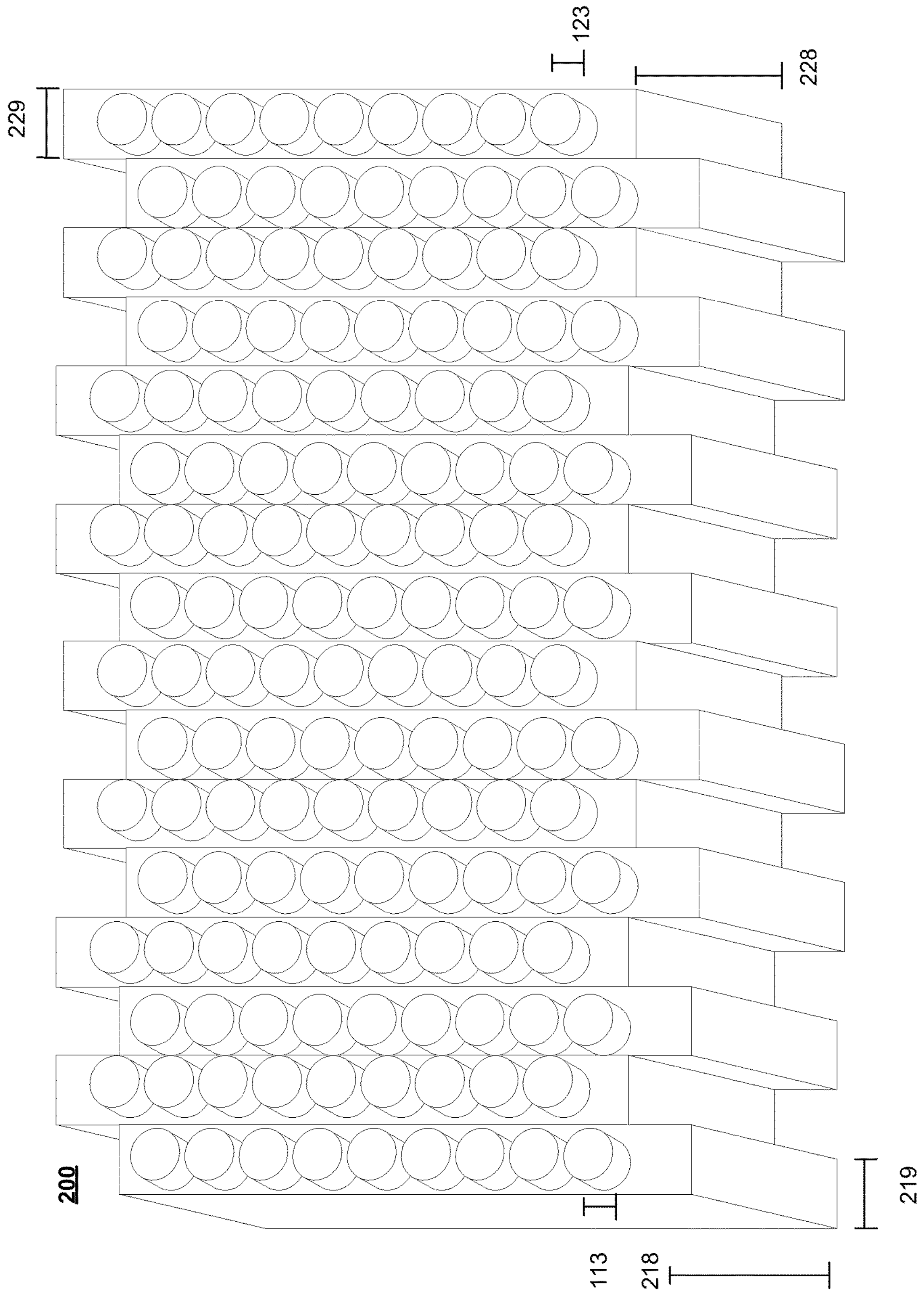

FIGS. 2A-2C illustrate a hole array configuration 200 of outlets 110 and inlets 120. A surface 205 of the device 100 includes regularly spaced outlets 110 and inlets 120. As a non-limiting example, outlets 110 and inlets 120 may be configured in substantially rectangular lines next to each other. Outlets 110 are disposed on microchannels 217 and inlets 120 are disposed on microchannels 227. Connections 215 of the microchannels 217 from the outlets 110 to pump 130 may be disposed on one side of the surface 205, and connections 225 of the microchannels 227 from the inlets 120 to pump 130 may be disposed on another side of the surface 205. However, this is merely an example.

FIG. 2A shows a top view geometry of hole array configuration 200. The holes may be substantially equally distanced from each other. Four inlets 120 surround all non-edge outlets 110, and four outlets 110 surround all non-edge inlets 120. By providing substantially equal pressure to the surrounding outlets 110 and inlets 120, all (or substantially all) fluid ejected from the outlets 110 will be divided between by the surrounding inlets 110.

Edge outlets 210 and edge inlets 220 may be angled inwards towards a center of the surface, and/or size or shaped differently from remaining outlets 110 and inlets 120, to limit fringing of the hydrodynamic barrier. The various changes (e.g., angling or sizing) may be determined based on, for example, varying surface geometry (e.g., radius of curvature or topography) and/or surface material. In some cases, a degree of desired protection may vary across surface 205, and outlet 110/inlet 120 configuration and density may be varying across surface 205 accordingly. In some cases, edge outlets 210 and edge inlets 220 may have relatively less inflow or outflow (e.g., pressure) than inner outlets 110 and inlets 120. For example, corner outlet 211 and corner inlet 221 may have one-fourth the outflow and inflow as interior outlet 110 and interior inlet 120, respectively. The remaining edge outlets 210 and edge inlets 220 may have approximately one-half the outflow and inflow as interior outlet 110 and interior inlet 120, respectively. One of ordinary skill will understand that this is merely an example, and, in some cases, uneven pressure may be provided to various outlets and/or inlets to sample an environment, emit into the environment, or otherwise adjust the hydrodynamic barrier. In certain implementations, edge outlets 210 and inlets 220 may be relatively closer to neighboring inlets 120 and outlet 110. By reducing the outlet-to-inlet distance on edges, fringing may be reduced. In an embodiment, inlets 220 may surround an entire edge of the surface. Accordingly, concerns about outlet fringing effects (e.g., leaching or diffusion) may be minimized, and only inlet fringing effects (e.g., oversampling) may be considered.

FIG. 2B illustrates a zoomed in configuration of one outlet 110 and four surrounding inlets 120. Outlet 110 is spaced a distance 231 from each inlet 120. Inlets 120 are spaced a distance 232 from each neighboring inlet 120. As non-limiting examples, distance 231 may be approximately 10 μm and distance 232 may be approximately 10√2 μm. However, this is merely an example, in some cases, distance 231 may be approximately 30 μm and distance 232 may be approximately 30√2 μm. A diameter of outlets 110 may be 111, and a diameter of inlets 120 may be 121. Diameter 111 and diameter 121 may be substantially similar, but this is merely an example. In some cases, diameter 111 and/or diameter 121 may be approximately one-third of distance 231.

FIG. 2C illustrates a perspective view of hole array configuration 200. As can be seen, microchannels 217 each have a height of 218 and a width of 219, and microchannels 227 each have a height 228 and a width of 229. As non-limiting examples, height 218 and height 228 may be approximately 50 μm or 60 μm, width 219 and width 229 may be approximately 13 μm. One of ordinary skill will recognize that these are merely examples. In some cases, height 218 and height 228 may be increased. The increase in height may increase channel resistance and improve uniformity of the pressure of the outlets 110 and inlets 120, and fluidic flux of barrier device 100.

The microchannels 217 and 227 may be separated, for example, by about 1 μm. But this is merely an example. In some cases, microchannels 217 and 227 may be separated by greater distances (e.g., 8 μm or more). Such separation may make the device 100 easier to manufacture.

Outlets 110 may have a height of 113 and inlets 120 may have a height of 123. As non-limiting example, height 113 and height 123 may be approximately 20 μm and/or 50 μm. However, this is merely an example. The inventors surprisingly found that increasing height 113 and height 123 led to greater uniformity of pressure across surface 200.

Figure 3B:
FIGS. 3A-3C illustrate a rectangular trench array configuration according to an embodiment.
Figure 3A:
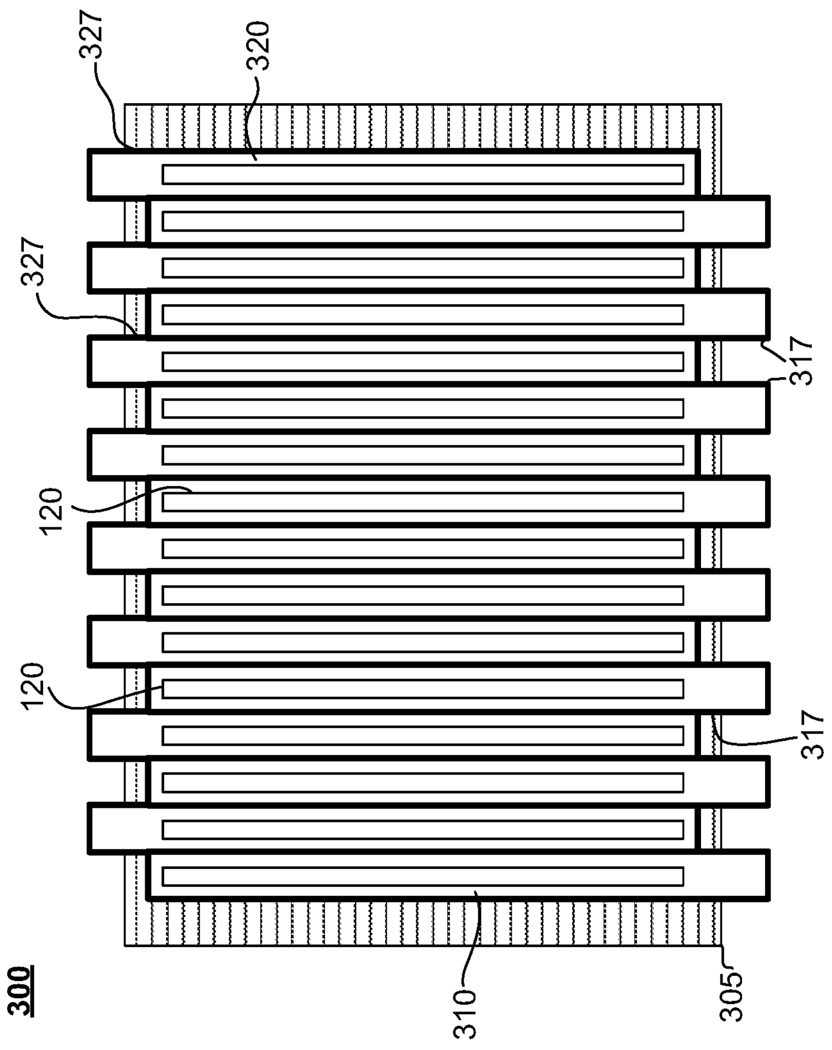
Figure 3C:
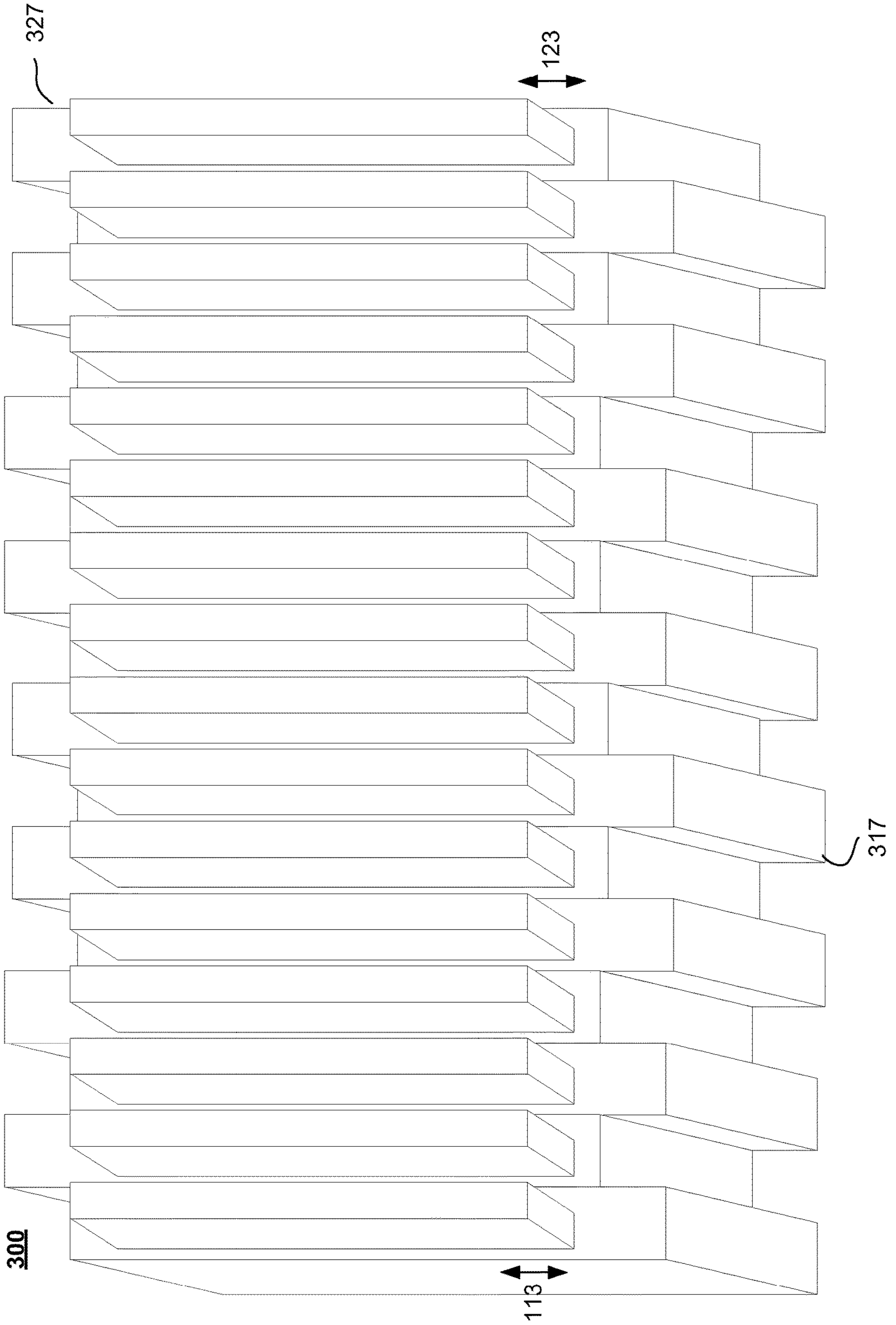

FIG. 3A-3C illustrate rectangular trench array configuration 300. A surface 305 of the device 100 includes regularly spaced outlets 110 and inlets 120 formed as trenches. As a non-limiting example, outlets 110 and inlets 120 may be configured in substantially rectangular trenches next to each other. Outlets 110 are disposed on microchannels 317 and inlets 120 are disposed on microchannels 378. Ends of microchannels 317 may be disposed on one side of the surface 305 and connect to pump 130, and connections ends of the microchannels 227 may be disposed on another side of the surface 305 and connect to pump 130. However, this is merely an example.

FIG. 3A shows a top view geometry of rectangular trench array configuration 300. The trenches 110 and 120 may be substantially equally distanced from each other, with alternating outlet 110 trench and inlet trench 120. By providing substantially equal pressure to the surrounding outlets 110 and inlets 120, all (or substantially all) fluid ejected from the outlets 110 will be divided between by the neighboring inlets 110.

Edge outlet 310 and edge inlet 320 may be angled inwards towards a center of the surface to limit fringing of the hydrodynamic barrier, and/or size or shaped differently. Moreover, edge outlet 310 and edge inlet 320 may have relatively less inflow or outflow (e.g., pressure) than inner outlets 110 and inlets 120. For example, edge outlet 310 and edge inlet 320 may have approximately one-half the outflow and inflow as interior outlet 110 and interior inlet 120, respectively. One of ordinary skill will understand that this is merely an example, and, in some cases, uneven pressure may be provided to various outlets and/or inlets to sample an environment, emit into the environment, or otherwise adjust the hydrodynamic barrier.

FIG. 3B illustrates a zoomed in configuration of one outlet 110 and one inlet 120. Outlet 110 is spaced a distance 331 from each inlet 120. As a non-limiting example, distance 331 may be approximately 30 μm. Outlet 110 has a length 111 and width 112, and inlet 120 has a length 121 and width 122. Length 111 and length 121 may be substantially similar, and width 112 and width 122 may be substantially similar, but this is merely an example. As an example, length 111 and/or length 121 may be approximately 400 μm and width 112 and/or width 122 may be approximately 5 μm.

FIG. 3C illustrates a perspective view of rectangular trench array configuration 300. Microchannels 317 and microchannels 327 may be substantially similar to microchannels 217 and 227 described above with reference to FIGS. 2A-2C. Accordingly, a detailed description of the geometry and spacing is not repeated for compactness. Outlets 110 may have a height of 113 and inlets 120 may have a height of 123. As non-limiting example, height 113 and height 123 may be approximately 20 μm and/or 50 μm. However, this is merely an example. The inventors surprisingly found that increasing height 113 and height 123 led to greater uniformity of pressure across surface 300.

Figure 4B:
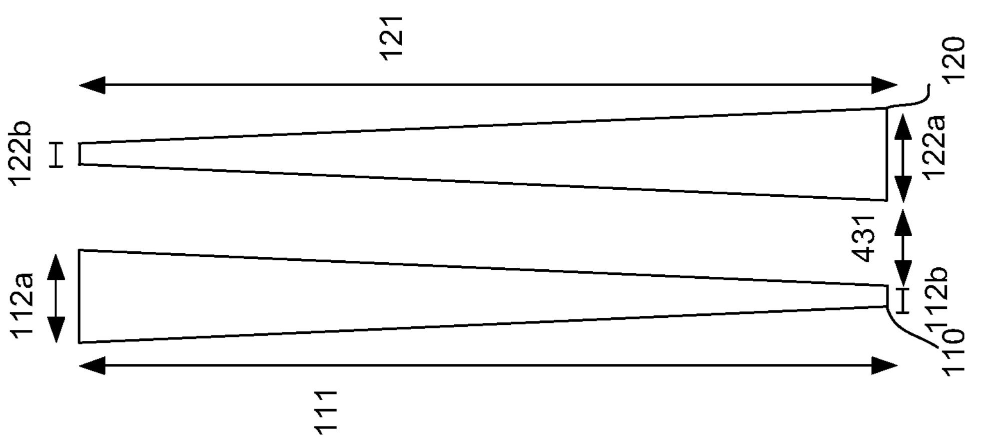
FIGS. 4A-4C illustrate a trapezoidal trench array configuration according to an embodiment.
Figure 4A:
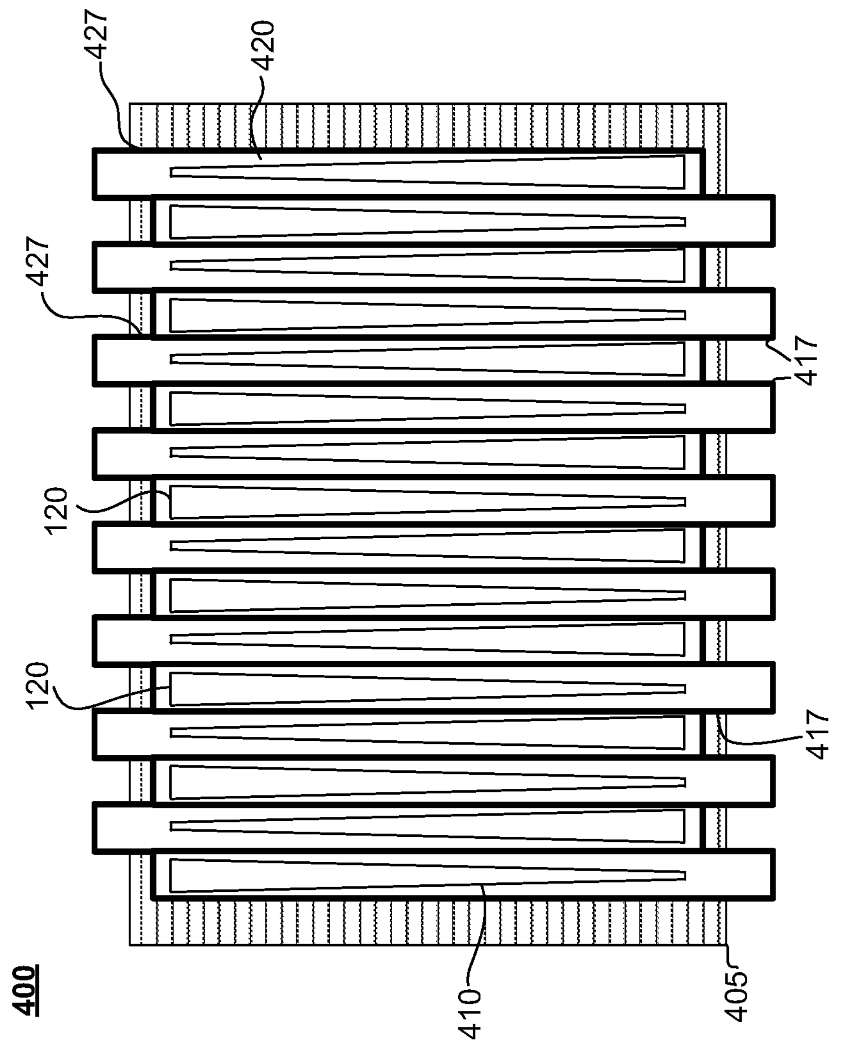
Figure 4C:
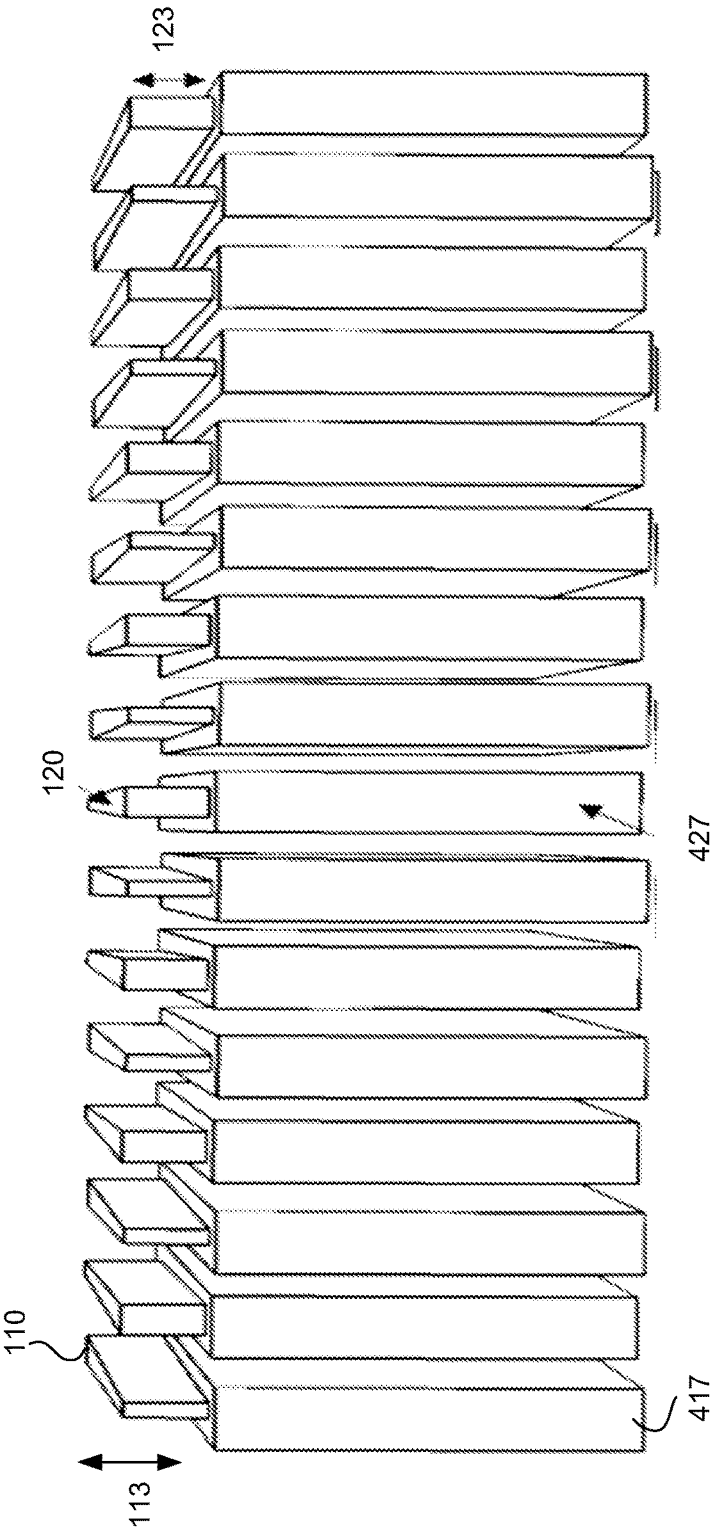

FIGS. 4A-4C illustrate trapezoidal trench array configuration 400. A surface 405 of the device 100 includes regularly spaced outlets 110 and inlets 120 formed as trenches. As a non-limiting example, outlets 110 and inlets 120 may be configured in substantially trapezoidal trenches next to each other. Outlets 110 are disposed on microchannels 417 and inlets 120 are disposed on microchannels 427. Ends of microchannels 417 may be disposed on one side of the surface 405 and connect to pump 130, and connections ends of the microchannels 427 may be disposed on another side of the surface 405 and connect to pump 130. However, this is merely an example.

FIG. 4A shows a top view geometry of trapezoidal trench array configuration 400. The trenches 110 and 120 may be substantially equally distanced from each other, with alternating outlet 110 trench and inlet trench 120. By providing substantially equal pressure to the surrounding outlets 110 and inlets 120, all (or substantially all) fluid ejected from the outlets 110 will be divided between by the neighboring inlets 110. Edge outlet 410 and edge inlet 420 may be angled inwards towards a center of the surface to limit fringing of the hydrodynamic barrier, and/or size or shaped differently. Moreover, edge outlet 410 and edge inlet 420 may have relatively less inflow or outflow (e.g., pressure) than inner outlets 110 and inlets 120. For example, edge outlet 410 and edge inlet 420 may have approximately one-half the outflow and inflow as interior outlet 110 and interior inlet 120, respectively. One of ordinary skill will understand that this is merely an example, and, in some cases, uneven pressure may be provided to various outlets and/or inlets to sample an environment, emit into the environment, or otherwise adjust the hydrodynamic barrier.

FIG. 4B illustrates a zoomed in configuration of one outlet 110 and one inlet 120. Outlet 110 is spaced a distance 431 from each inlet 120. As a non-limiting example, distance 431 may be approximately 30 μm. Outlet 110 has a length 111, a first width **112*a*, and second width 112*b*, and inlet 120 has a length 121, a first width 122*a*, and second width 122*b*. Length 111 and length 121 may be substantially similar, width 112***a* and width 122*a* may be substantially similar, and width 112*b* and 122*b* may be substantially similar, but this is merely an example. As an example, length 111 and/or length 121 may be approximately 400 μm. Width 112*a* and/or width 122*a* may be approximately 10 μm. Width 112*b* and/or width 122*b* may be between 4 and 6 μm, for example, approximately 4, 5, 5.5, and/or 6 μm. Width 112*b* and/or width 122*b* of around 5.5 μm may be particularly useful. In other implementations, widths 112*a* and 122*a* may be approximately 20 μm, width 112*b* and 122*b* may be approximately 11 μm, and length 111 and length 121 may be approximately 60 μm-420 μm, e.g., 60, 120, and or 420 μm.

FIG. 4C illustrates a perspective view of trapezoid trench array configuration 400. Microchannels 417 and microchannels 427 may be substantially similar to microchannels 217 and 227 described above with reference to FIGS. 2A-2C. Accordingly, a detailed description of the geometry and spacing is not repeated for compactness. Outlets 110 may have a height of 113 and inlets 120 may have a height of 123. As non-limiting example, height 113 and height 123 may be approximately 20 μm and/or 50 μm. However, this is merely an example. The inventors surprising found that increasing height 113 and height 123 led to greater uniformity of pressure across surface 300. The inventors also surprisingly found that the use of trapezoidal trenches provided improved fluid-flow uniformity over rectangular trench and hole array designs.

Figure 5A:
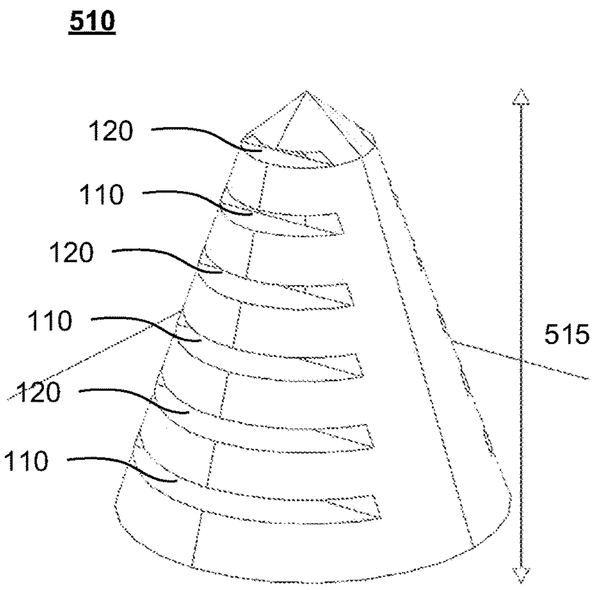
FIGS. 5A-5F illustrate a microneedle configuration according to an embodiment.

FIGS. 5A-5D illustrate a microneedle 510 disposed on a surface 505. Microneedle 510 incorporates outlets 110 and inlets 120 into a single form. Each microneedle 510 may be connected, for example to both an inlet microchannel and an outlet microchannel. Referring to FIG. 5A, microneedle has a substantially conical structure. Outlets 110 and inlets 120 are stacked on a front and back side of microneedle 510. Microneedle 510 may have a height 515, for example 800 μm. However, this is merely an example. Furthermore, a plurality of microneedles 510 may be applied each with different heights and/or arrangements and number of outlets 110 and inlets 120.

One of ordinary skill will recognize that, this is merely an example, and the microneedle may have various shapes and geometries and outlet 110 and inlet 120 positions. As non-limiting examples, a microneedle may be substantially tetrahedronic, pyramidal. Or various other polygonal shapes.

Figure 5B:
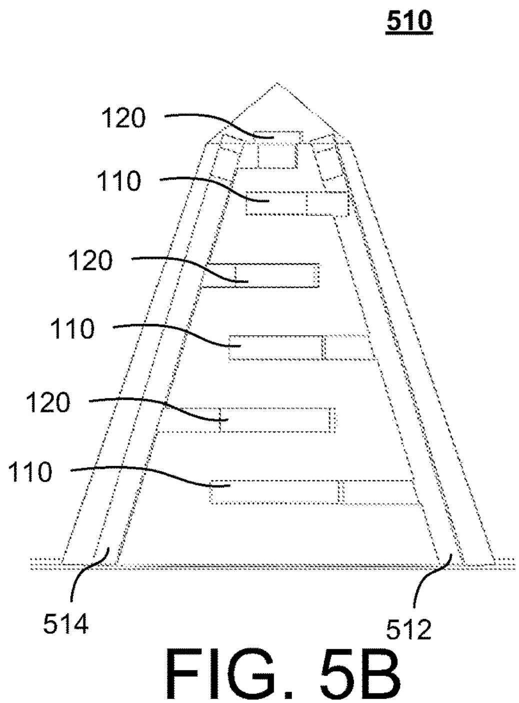
Figure 5C:
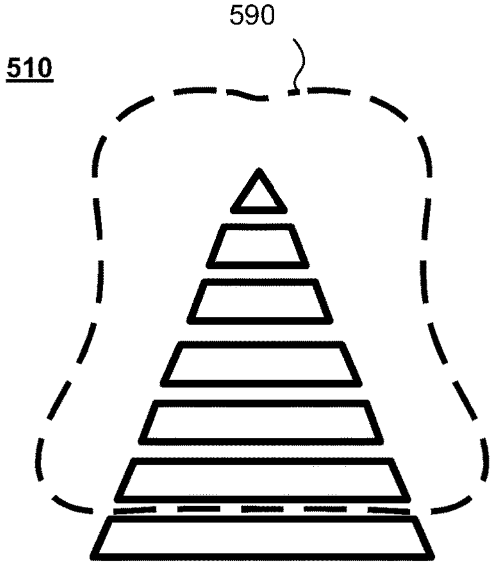
Figure 5D:
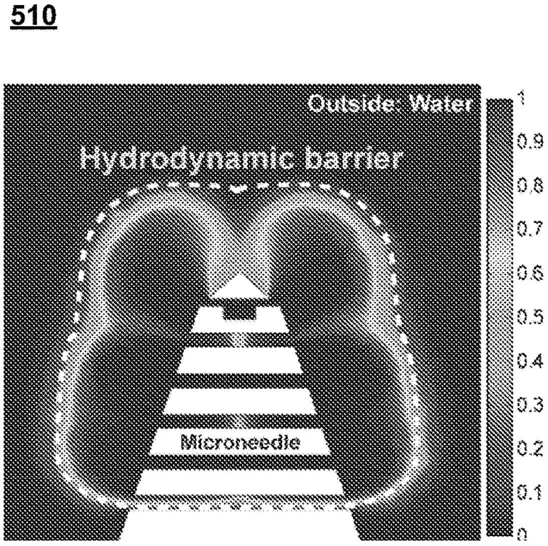

FIG. 5B illustrates a cross section of microneedle 510. A single outlet channel 512 is connected to all outlets 110, and a single inlet channel 514 is connected to all inlets 120, but this is merely an example. FIGS. 5C and 5D illustrate a simulation of hydrodynamic barrier 590 generated by pump 130 operating microneedle 510. The hydrodynamic barrier separates the microneedle from the outside water.

Figure 5E:
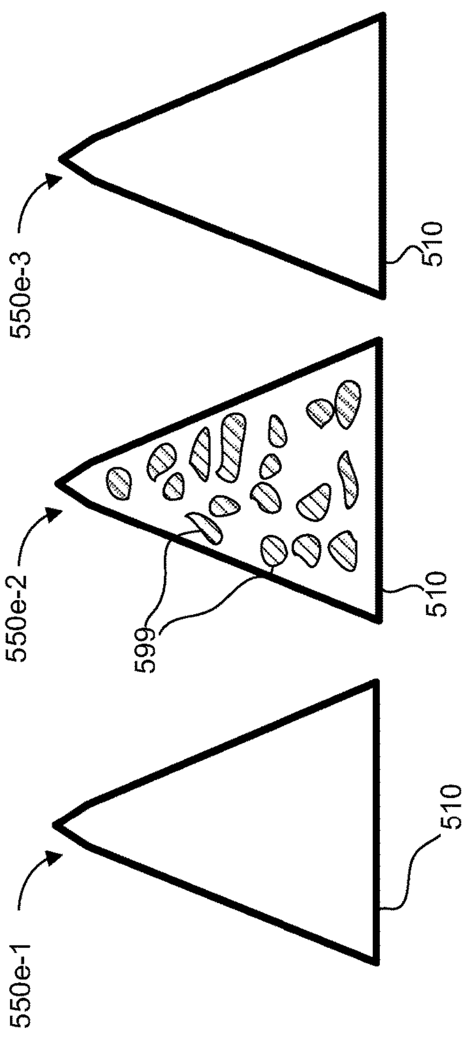
Figure 5F:
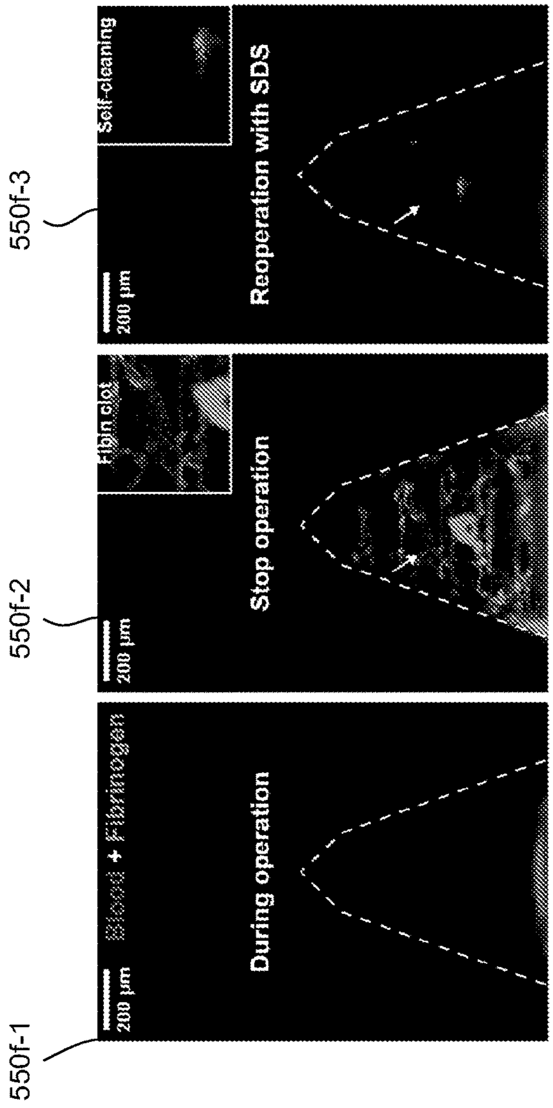

FIGS. 5E and 5F illustrates operation of a microneedle 510 according to an example implementation. In FIGS. 5E and 5F, microneedle 510 is submerged in blood and fibrinogen (a clotting agent). In 550*e*-1/550*f*-1, microneedle 510 is operating. Very little fibrinogen affixes to the surface of microneedle 510. In 550*e*-2/550*f*-2, microneedle 510 stops operating. Fibrinogen 599 adheres to microneedle 510 once the hydrodynamic barrier ceases. In 550*e*-3/550*f*-3, microneedle 510 re-operates, and the flow of fluid cleaning microneedle 510.

The novel microneedle 510 design can, in some cases, prevent virtually all fluid (e.g., detergent or other cleaning agent) from escaping into a surrounding environment.

As will be understood by one of ordinary skill, the outlet/inlet 110/120 geometries and positionings discussed herein are merely examples. It will be understood that can tune the outlet/inlet 110/120 geometries may be adjusted beyond those explicitly described to ensure desired (e.g., balanced) influx and outflux across the surface.

Although various devices have been described with discussion to inlet/out arrangements and/or microneedles, one of ordinary skill in light of the present disclosure will recognize that inlets and/or outlets may be formed in various geometries, shapes, and objects. In some cases, an objects surface may have embedded outlets 110 and inlets 120 such that a hydrodynamic barrier can be provided on any geometry, and demonstrated by the microneedle 510.

Figure 6A:
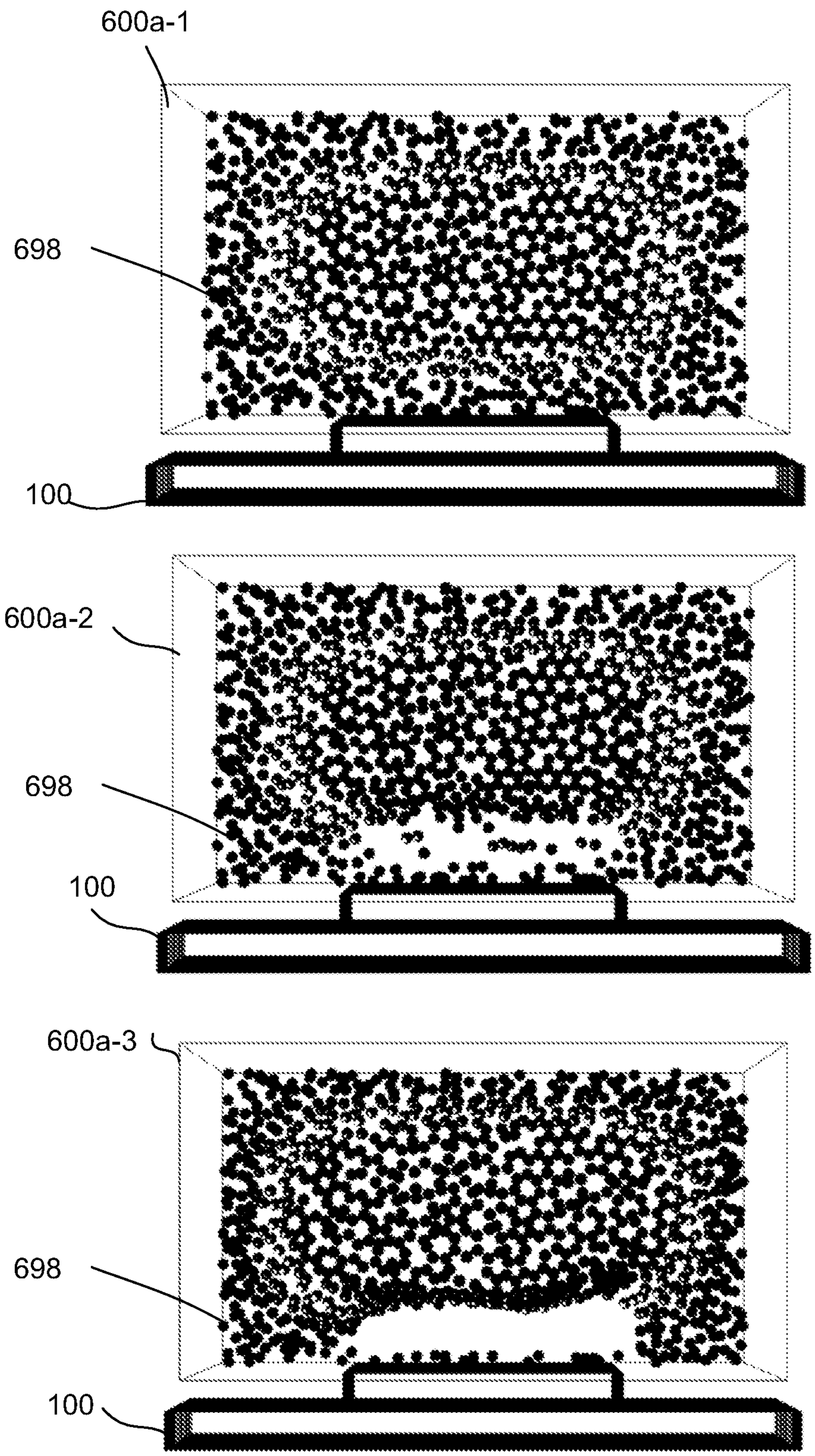
FIGS. 6A-6C illustrate operation of a barrier device according to an embodiment.
Figure 6B:
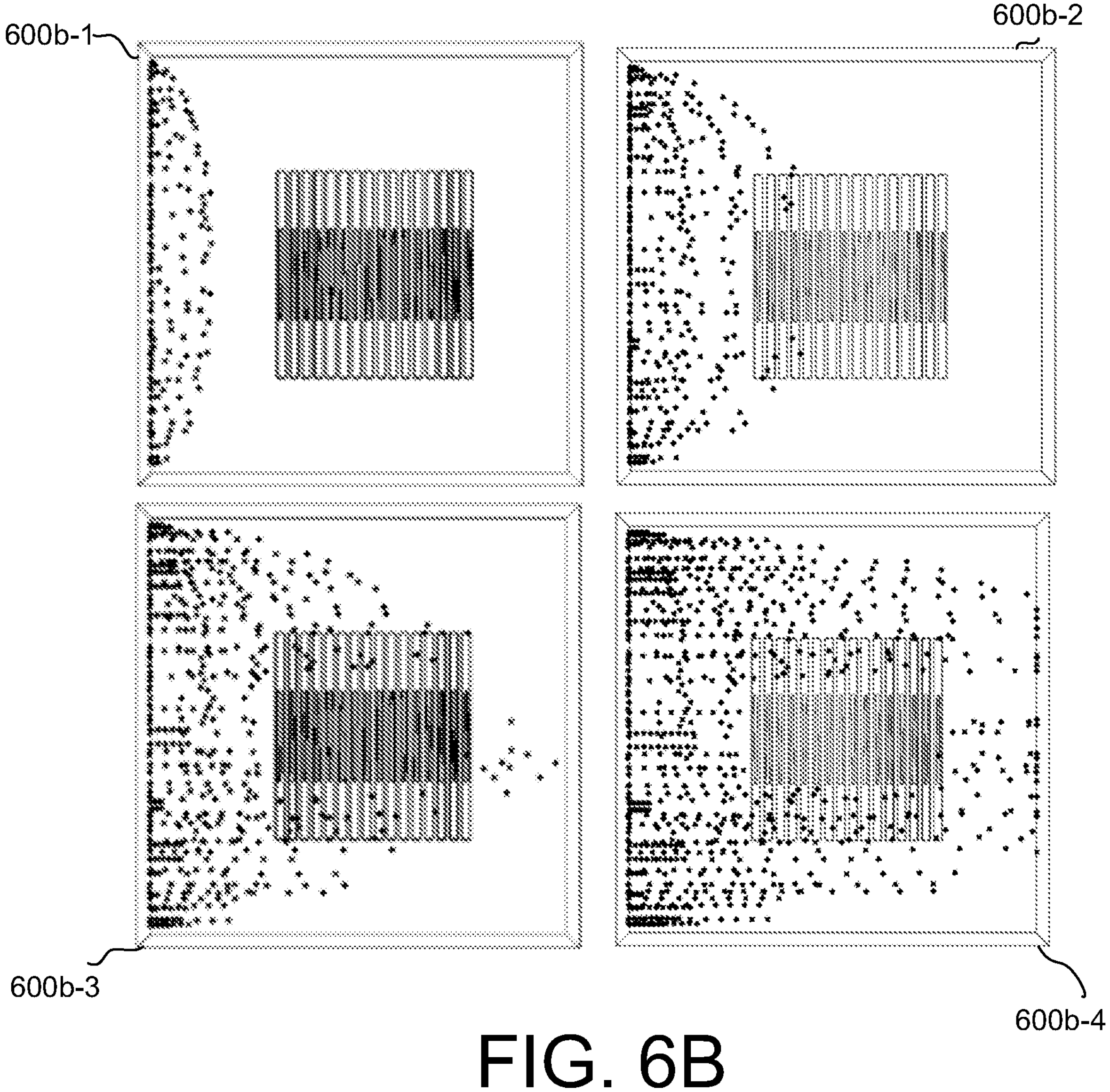
Figure 6C:
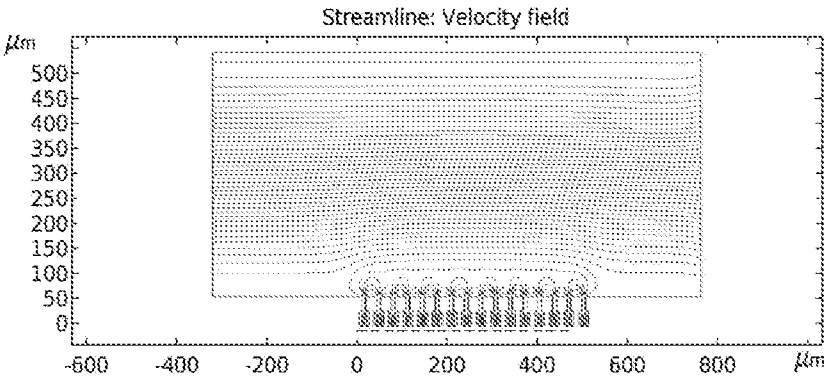

FIGS. 6A-6C illustrate operation of a barrier device 100 according to an embodiment. As will be understood, barrier device 100 may include one or more of the configurations discussed above with reference to FIGS. 2A-5F, and/or alternative configurations as will be understood by one of ordinary skill in light of the present disclosure. FIG. 6A illustrates barrier device 100 establishing a hydrodynamic barrier. In 600*a*-1, barrier device 100 is turned on after being off for an extended period of time such that no hydrodynamic barrier exists, and particles 698 and generally dispersed around barrier device 100. In 600*a*-2, the hydrodynamic barrier is being established and particles 698 being moving from the surface of barrier device 100. In 600*a*-3, the hydrodynamic barrier is established, separating barrier device 100 from particles 698 in a surrounding fluid. FIG. 6B illustrates a hydrodynamic barrier preventing impact by a current. At 600*b*-1 a current is released. Over 600*b*-2, 600*b*-3, and 600*b*-4, the current proceeds over device 100. However, the hydrodynamic barrier prevents the current from impacting the surface. FIG. 6C illustrates velocity fields of the current and the hydrodynamic barrier according to an example embodiment.

In some embodiments, magnetic and/or electrostatic fields may be used as a driving force (e.g., instead of pump 130). The magnetic/electric fields may generate similarly patterned field lines as a fluid creating a hydrodynamic layer. In terms of magnetic/electric field, this may be called surface-confined magnetic/electrostatic fields. In some cases, magnetic and/or metallic particles may be applied and made to circular on or near the surface. For example, magnetic beads (micro-/nanoparticle) can be made to circulate near the surface by surface-confined magnetic field. This circulating motion of the beads can physically scrape and lyse any fouling biomaterials on the surface, while the constant motion minimizes attachment in the first place. The field may be induced either with alternating permanent magnets (NSNSNS . . . ) or with electromagnetic (e.g., AC) fields. In some instances, electromagnets may be used to “steer” magnetic particles across the surface (for example, by rapidly changing and/or moving a magnetic source.

In some embodiments, hydrodynamic barriers may be used to locally change surface characteristics of a surface. For example, barrier device 100 may create a hydrodynamic air/fluid barrier to modify apparent surface friction of the underlying surface. For instance, an air barrier may more easily move through water than a typical hull surface. By creating a fluid barrier (e.g., hydrodynamic or bubble), apparent surface roughness to a surrounding environment can be reduced. Accordingly, in some cases, energy requirement of moving an object through an environment (e.g., fuel consumption) can be reduced. Such a system could have application in any types of moving surface, such as automobiles, planes, ships, space craft, tires, and/or propellers. As an example, this process can be thought of as similar to creating a barrier between an air hockey puck and a surface of an air hockey table.

Figure 7:
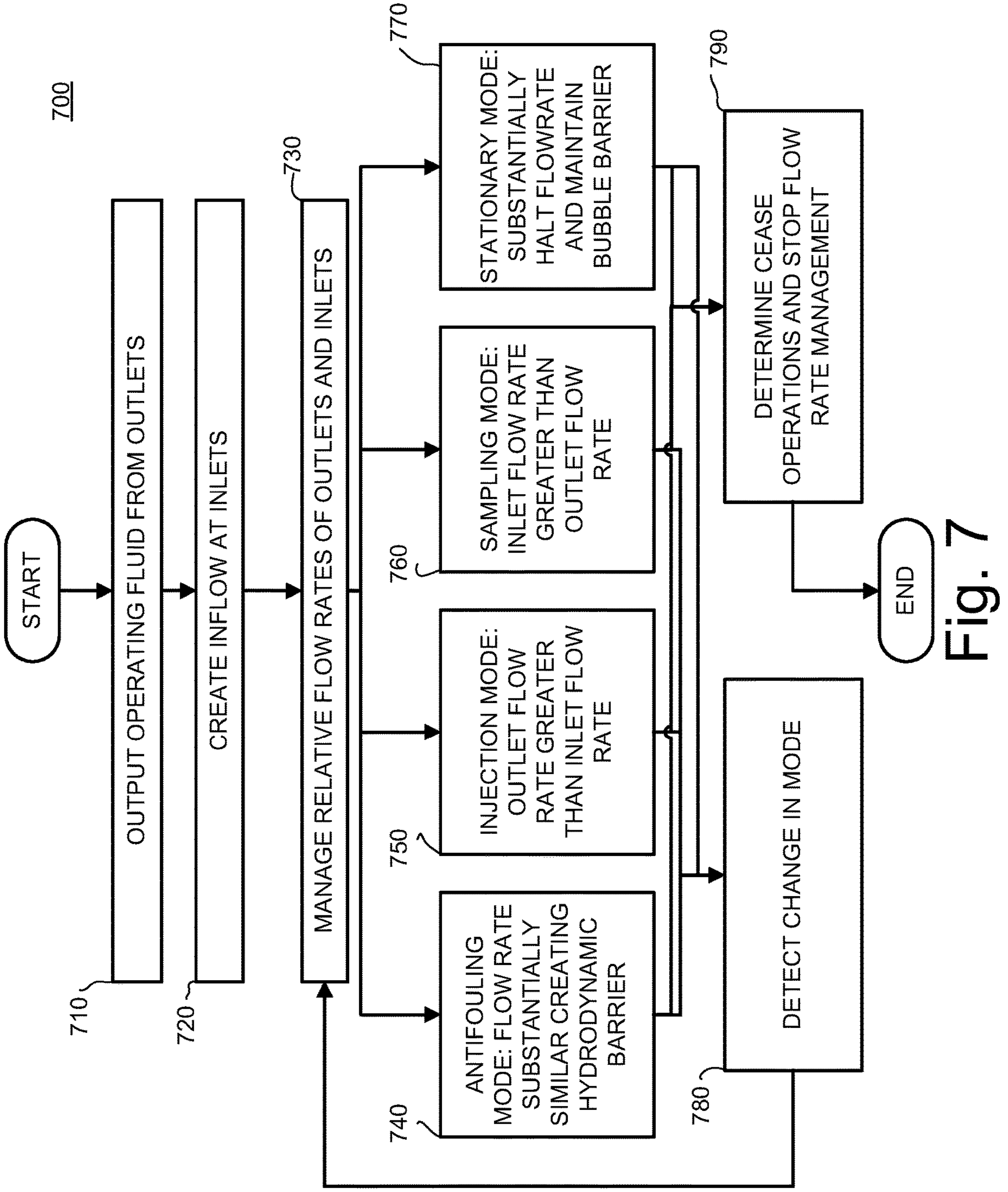
FIG. 7 is a flowchart of a method of operating a barrier device according to an embodiment.

FIG. 7 is a flowchart 700 of a method of operating a barrier device 100 according to an example embodiment. Barrier device 100 may be operated in accordance with flowchart 700 Referring to FIG. 7, barrier device 100 outputs 710 an operating fluid from a plurality of outlets (e.g., outlets 110). For example, pump 130 may pump (e.g., under control of controller 150) an operating fluid from reservoir 140 through microchannels 217/317/417 to outlets 110. In some cases, controller 150 may further select a reservoir 140 from a plurality of reservoirs, a specific fluid and/or a fluid mix to be the operating fluid, and control pump 130 to pump the corresponding fluid.

Barrier device 100 may further create 720 an inflow at a plurality of inlets (e.g., inlets 120). For example, pump 130 (e.g., under control of controller 150) may drive fluid from microchannels 227/327/427 to inlets 120. In some cases, pump 130 may simultaneously drive operating fluid to outlets 110 and create inflow at inlets 120.

Barrier device 100 manages 730 the relative flow rates of outlets 110 and inlets 120 according to an operating mode. In an antifouling mode or cleaning mode (740), the flow rate passing each of outlets 110 is substantially similar to the flow rate passing each of inlets 120; thus, the operating fluid discharged by outlets 110 is substantially collected by inlets 120 and the hydrodynamic barrier is formed on the surface. In injection mode (750), the output from the outlets 110 is greater than the flow rate of the inlets 120, thereby discharging fluid outside of the device. In sampling mode (760), the flow rate of the inlets 120 is greater than the flow rate of the outlets, thereby collecting fluid from a surrounding environment. In stationary mode (770), after formation of a bubble covering the surface of interest, the external pump substantially stops operation and outlet 110 and inlet 120 flow.

Barrier device 100 detects 780 a change of operating mode, and barrier device 100 managers 730 the relative flow rates of outlets 110 and inlets 120 according to the changed operating mode. If no change of mode is detected, barrier device 100 may eventually determine 790 operation is to cease, and stop managing flow rates.

FIGS. 9A-9G illustrate manufacturing a microchannel and trench cast 930 of a barrier device 100 according to an embodiment. One of ordinary skill will recognize that FIGS. 9A-9G represent an example, non-limiting manufacturing technique using photolithography. In some cases, microchannels 217/227 and outlets/inlets 110/120 may be fabricated in a number of ways, such as 3D lithography, 3D printing, and UV curable material.

Figures 9A, 9B, 9C, 9D, 9E, 9F, 9G:
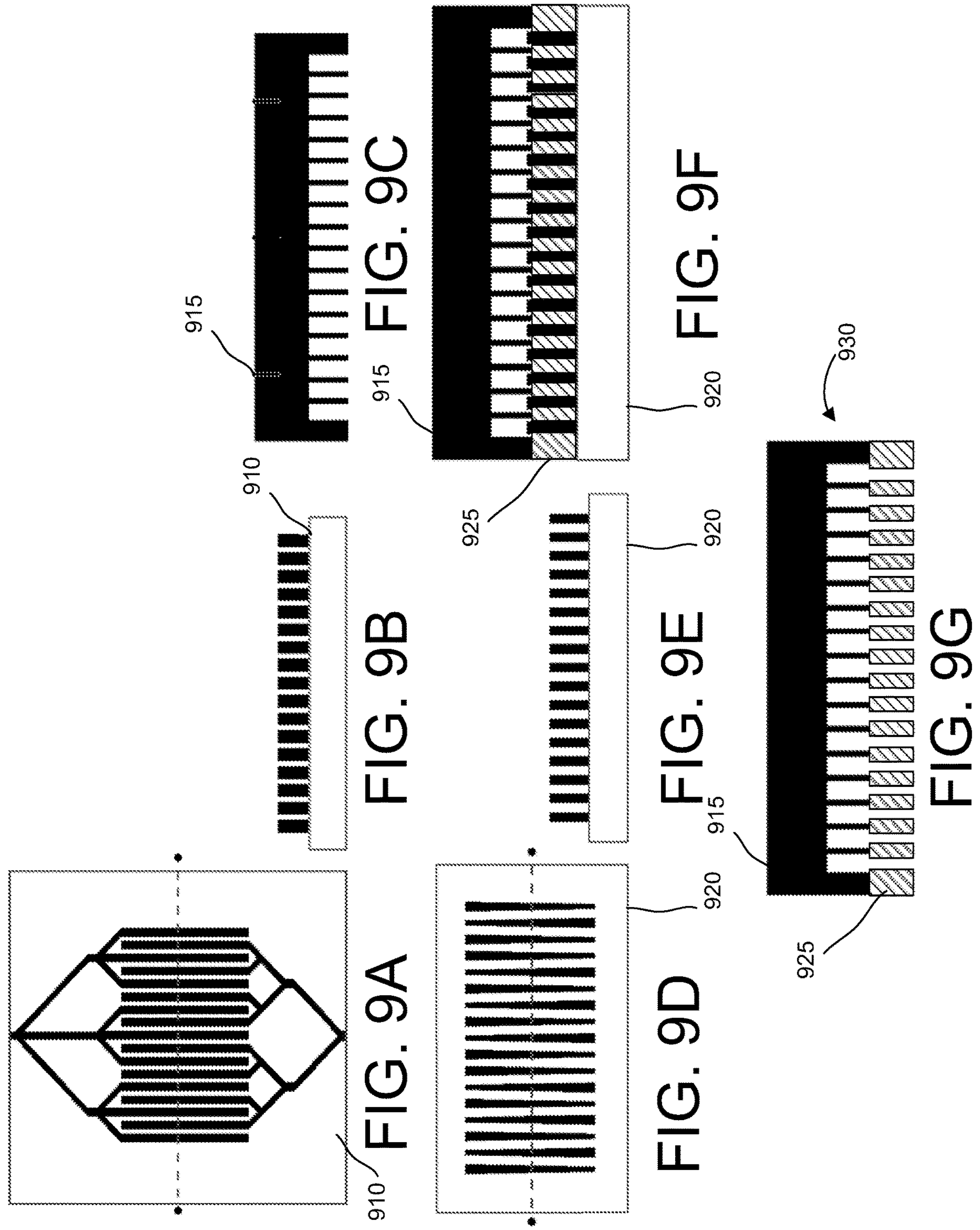
FIGS. 9A-9G illustrate manufacturing a microchannel and trench cast of a barrier device according to an embodiment.

FIGS. 9A and 9B illustrate top and cross-cut views of a microchannel mold 910. Mold 910 may be fabricated, for example, using soft lithography on a silicon wafer. FIG. 9C illustrates a microchannel cast 915 that may be formed from microchannel mold 910, for example, by coating the mold 910 with polydimethylsiloxane (PDMS) (e.g., spin coating) and allowing the PDMS to cure.

FIGS. 9D and 9E illustrates top and cross-cut views of outlet/inlet mold 920. Mold 920 may be fabricated, for example, using soft lithography on a silicon wafer. Although mold 920 as illustrated is for a trench array, this is merely an example. FIG. 9F illustrates an outlet/inlet cast 925 being formed from outlet/inlet mold 920, for example, by coating the mold 920 with polydimethylsiloxane (PDMS) (e.g., spin coating) and allowing the PDMS to cure. Microchannel cast 915 is aligned and bonded to outlet/inlet cast 925 (e.g., by treating microchannel cast 915 and/or outlet/inlet mold 925 with corona plasma and a few drops of ethanol to prevent irreversible bonding during alignment). The combined microchannel and trench cast 930 is formed (FIG. 9G) and a microchannel and trench can be generated for barrier device 100.

FIG. 10 is a block diagram of a barrier device 1000 according to an embodiment. Referring to FIG. 10, barrier device 1000 includes an outlet 110, an inlet 120, pump 130, reservoir 140, and controller 150. As can be seen, barrier device 1000 of FIG. 10 is substantially similar to barrier device 100 illustrated in FIG. 1, except for barrier device 1000 of FIG. 10 only includes a single outlet 110 and a single inlet 120. Outlet 110, inlet 120, pump 130, reservoir 140, and controller 150 may function substantially similar to similar elements described above with reference to FIG. 1. Accordingly, a detailed description is not repeated.

Figure 11:
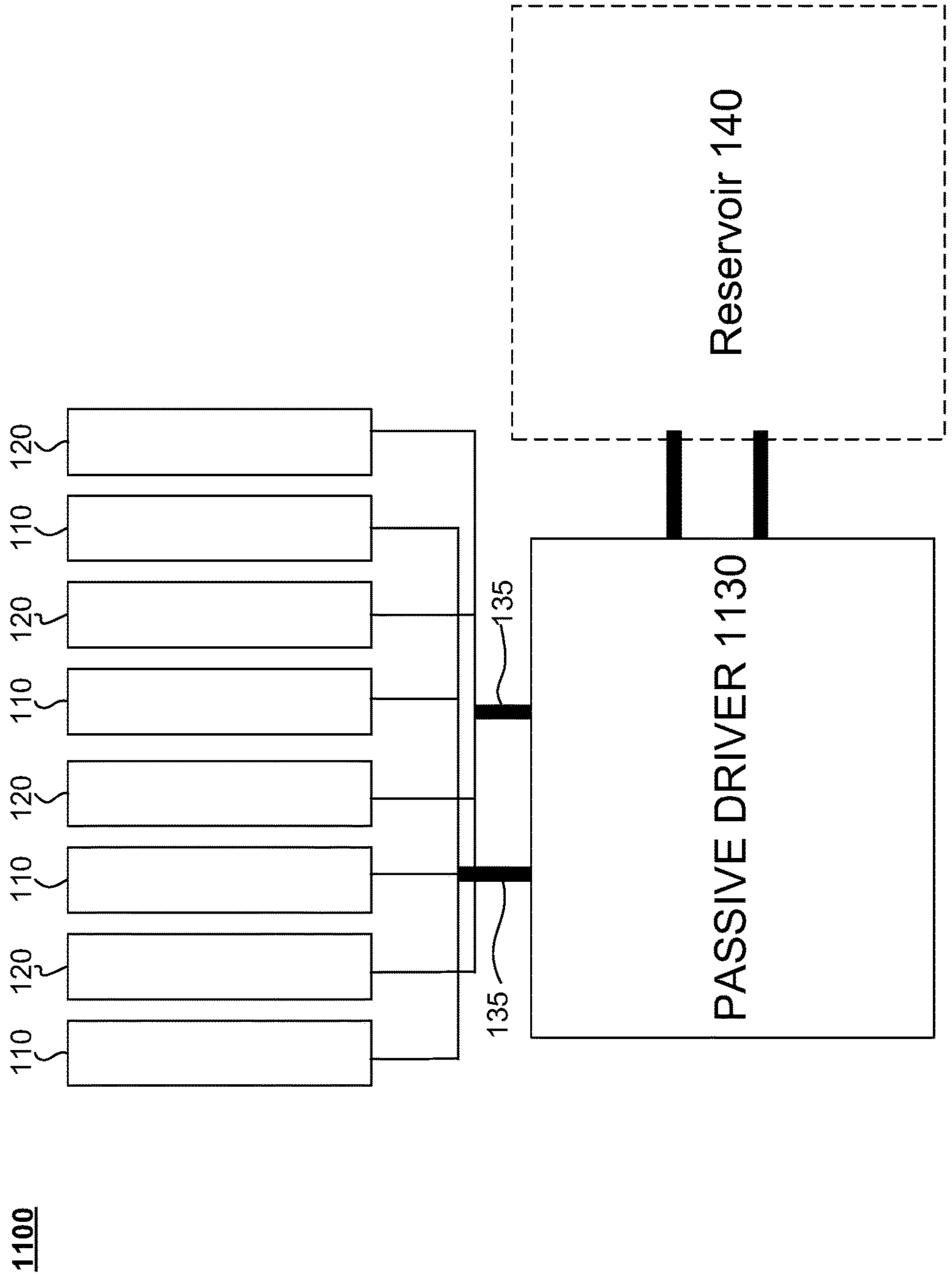
FIG. 11 is a block diagram of a barrier device according to an embodiment.

FIG. 11 is a block diagram of a barrier device 1000 according to an embodiment. Referring to FIG. 11, barrier device 1000 includes a plurality of outlets 110, a plurality of inlets 120, passive driver 1130 (e.g., an energy harvester), and reservoir 140. Outlets 110, inlets 120, and reservoir 140, may function substantially similar to similar elements described above with reference to FIG. 1. Accordingly, a detailed description of these elements is not repeated herein. Barrier device 1000 includes passive driver 1130. Passive driver 1130 may be configured to harvest energy from an ambient environment to control the flow of an operating fluid from outlets 110 and into inlets 120. As a non-limiting example, passive driver 1130 may be configured to harvest mechanical energy from the relative motion of barrier device to a surrounding environment (e.g., of a moving ship) to drive the inlets and outlets to circulate the operating fluid. In some cases, passive driver 1130 may driver the outlets 110 and inlets 120 to generate a hydrodynamic barrier with an environmental fluid from a surrounding environment.

Figure 12:
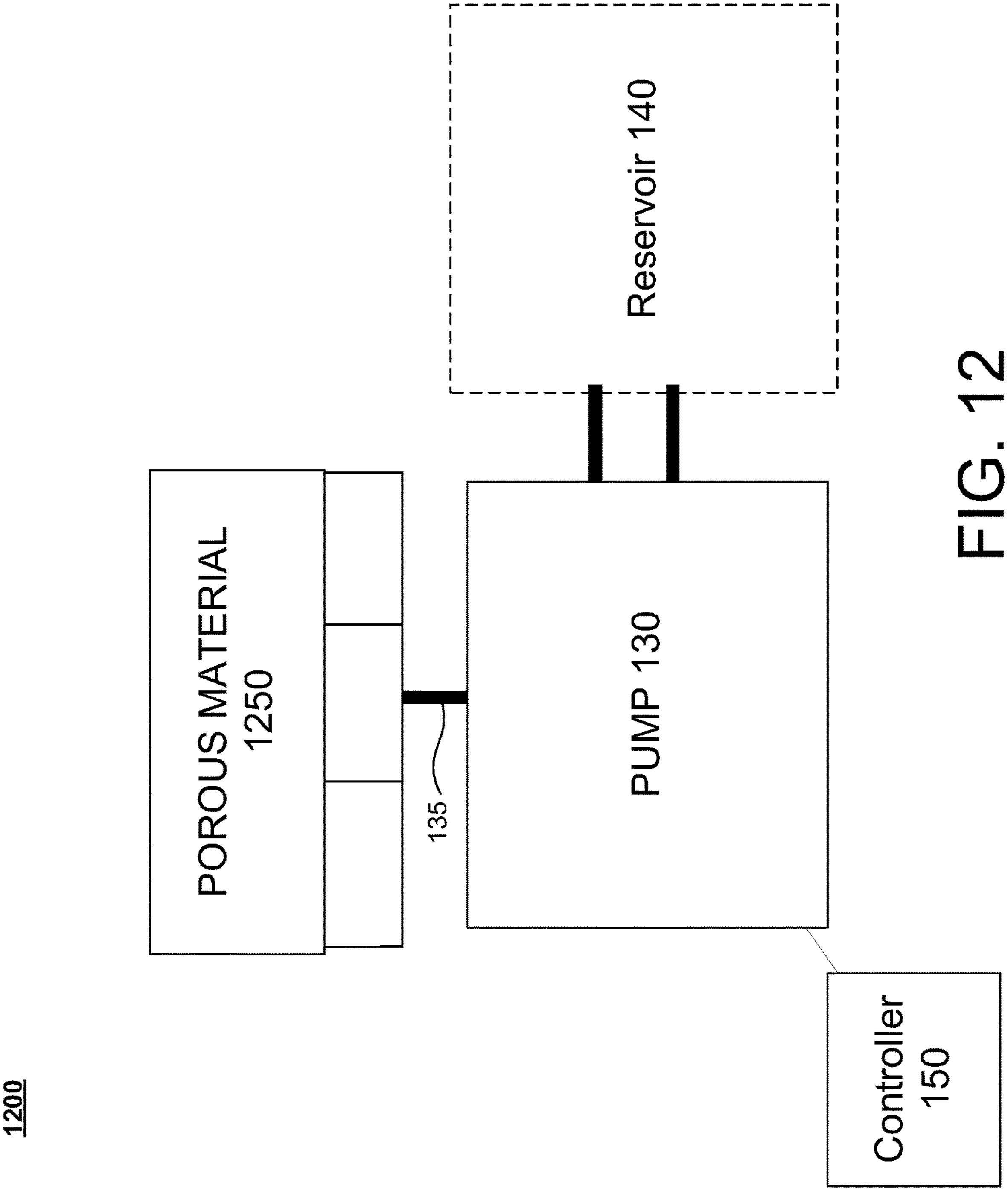
FIG. 12 is a block diagram of a barrier device according to an embodiment.

FIG. 12 is a block diagram of a barrier device 1200 according to an embodiment. Referring to FIG. 12, barrier device 1200 includes a porous material 1250 (e.g., naturally porous material, such as a hydrogel), pump 130, reservoir 140, and controller 150. Pump 130, reservoir 140, and controller 150 may function substantially similar to similar elements described above with reference to FIG. 1. Accordingly, a detailed description of these elements is not repeated herein. Barrier device 1200 includes porous material 1250. Porous material 1250 may function as outlets 110, inlets 120, and/or both. As a non-limiting example, porous material 1250 may be disposed on a surface, and fluidly connected to pump 130. Pump 130 may pump an operating fluid out of porous material 1250, and/or draw environmental fluid into porous material 1250. In some cases, pump 130 may maintain a layer of the operating fluid (e.g., a bubble layer) on a surface of porous material 1250. For example, pump 130 may rapidly switch from pumping out to pumping in to generate and maintain a protective layer of the operating fluid on the surface.

Figure 13:
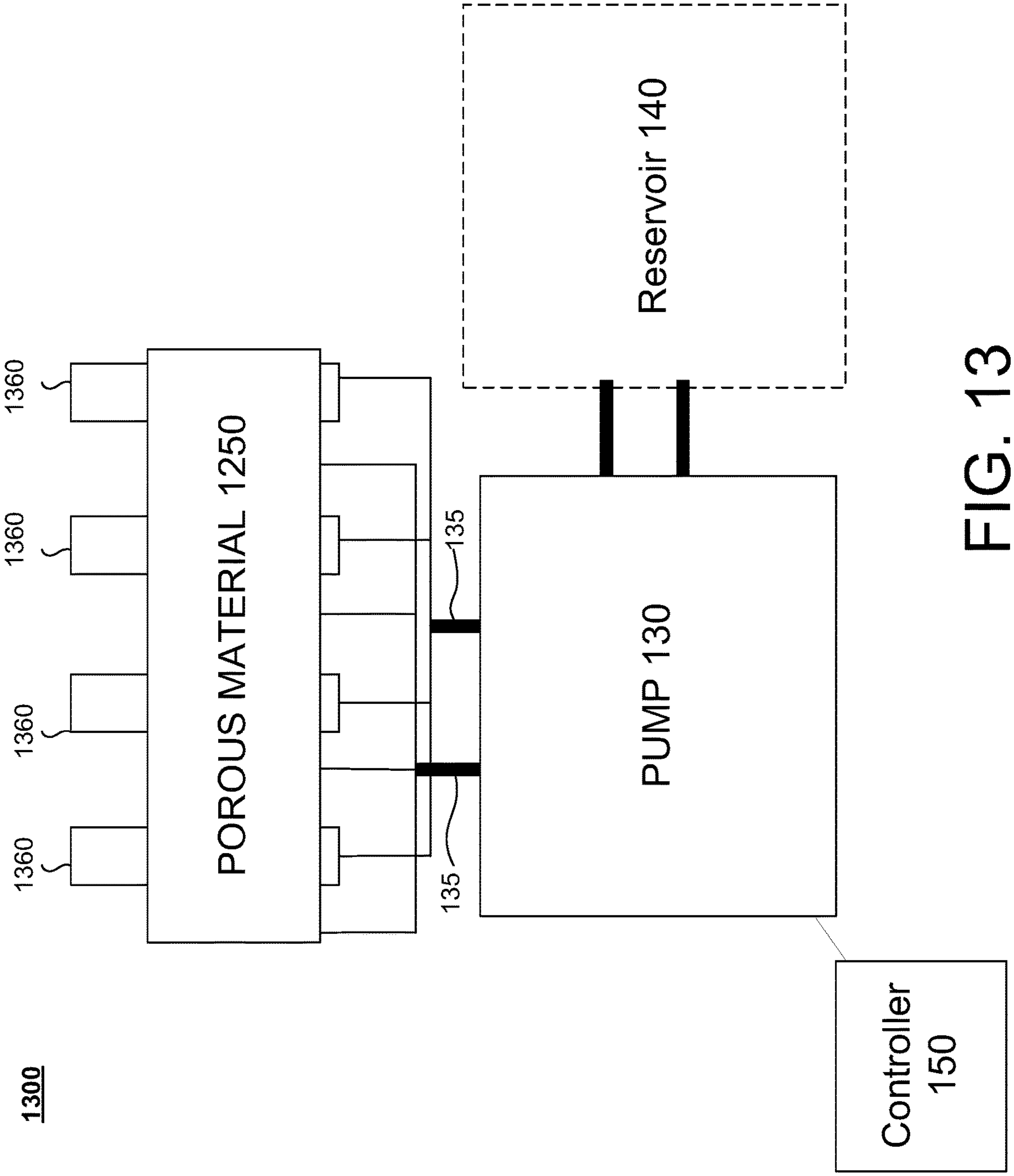
FIG. 13 is a block diagram of a barrier device according to an embodiment.

FIG. 13 is a block diagram of a barrier device 1300 according to an embodiment. Referring to FIG. 13, barrier device 1300 includes a porous material 1250, secondary holes 1360, pump 130, reservoir 140, and controller 150. Pump 130, reservoir 140, and controller 150 may function substantially similar to similar elements described above with reference to FIG. 1. Accordingly, a detailed description of these elements is not repeated herein. Barrier device 1300 includes porous material 1250, which may be substantially similar to the porous material 1250 described with reference to FIG. 12, and may function as outlets 110, inlets 120, and/or both. Barrier device 1300 further includes secondary holes 1360 which may also function as outlets 110, inlets 120, and/or both. For example, secondary holes 1360 may operate as outlets 110, and porous material 1250 may operate as inlets 120 such that a hydrodynamic barrier is maintained on the surface. However, this is merely an example, and one of ordinary skill will recognize that various changes and/or alterations of operation may be made without departing from the scope of the present disclosure without.

Although the present disclosure regularly refers to barrier device 100, one of ordinary skill will recognize in light of the present disclosure that similar features, discussions, and examples may be applied to barrier devices 1000, 1100, 1200, and 1300 unless explicitly disclaimed or inherently incompatible.

Figure 8:
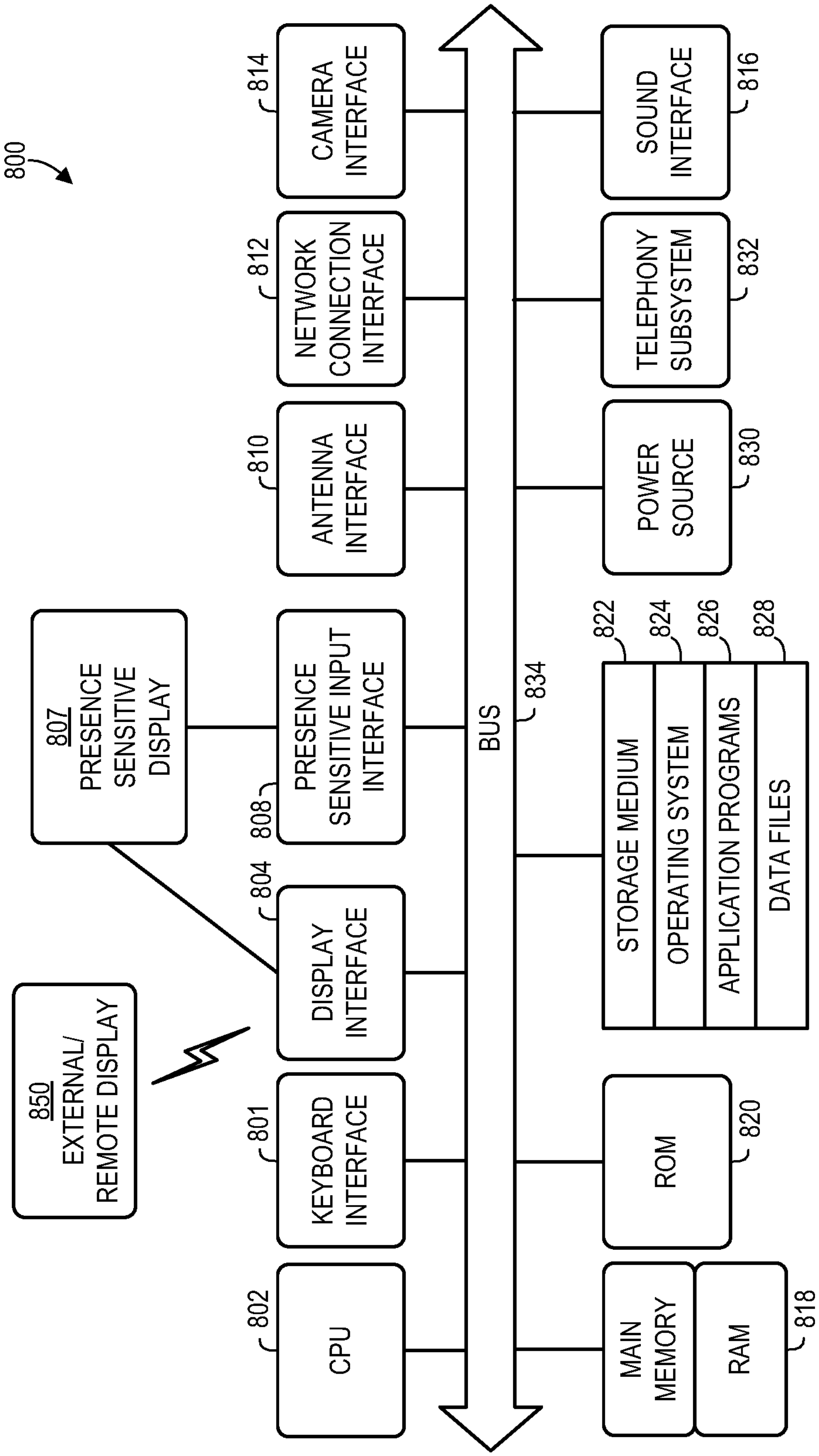
FIG. 8 is a computer architecture diagram for implementing certain aspects of a barrier device according to an embodiment.

Aspects of the disclosed technology may be implemented using at least some of the components illustrated in the computing device architecture 800 of FIG. 8. For example, controller 150, may be implemented with one or more of the components depicted in FIG. 8. As shown, the computing device architecture 800 includes a central processing unit (CPU) 802, where computer instructions are processed; a display interface 804 that acts as a communication interface and provides functions for rendering video, graphics, images, and texts on the display. In certain example implementations of the disclosed technology, the display interface 804 may be directly connected to a local display, such as a touch-screen display associated with a mobile computing device. In another example implementation, the display interface 804 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 804 may wirelessly communicate, for example, via a Wi-Fi channel or other available network connection interface 812 to the external/remote display.

In an example implementation, the network connection interface 812 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 804 may be operatively coupled to a local display, such as a touch-screen display associated with a mobile device. In another example, the display interface 804 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 804 may wirelessly communicate, for example, via the network connection interface 812 such as a Wi-Fi transceiver to the external/remote display.

The computing device architecture 800 may include a keyboard interface 806 that provides a communication interface to a keyboard. In one example implementation, the computing device architecture 800 may include a presence-sensitive display interface 808 for connecting to a presence-sensitive display 807. According to certain example implementations of the disclosed technology, the presence-sensitive display interface 808 may provide a communication interface to various devices such as a pointing device, a touch screen, a depth camera, etc. which may or may not be associated with a display.

The computing device architecture 800 may be configured to use an input device via one or more of input/output interfaces (for example, the keyboard interface 806, the display interface 804, the presence sensitive display interface 808, network connection interface 812, camera interface 814, sound interface 816, etc.) to allow a user to capture information into the computing device architecture 800. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 800 or may be a separate device. For example, the input device may be an accelerometer, a magnetometer, a digital camera, a microphone, and an optical sensor.

Example implementations of the computing device architecture 800 may include an antenna interface 810 that provides a communication interface to an antenna; a network connection interface 812 that provides a communication interface to a network. As mentioned above, the display interface 804 may be in communication with the network connection interface 812, for example, to provide information for display on a remote display that is not directly connected or attached to the system. In certain implementations, a camera interface 814 is provided that acts as a communication interface and provides functions for capturing digital images from a camera. In certain implementations, a sound interface 816 is provided as a communication interface for converting sound into electrical signals using a microphone and for converting electrical signals into sound using a speaker. According to example implementations, a random-access memory (RAM) 818 is provided, where computer instructions and data may be stored in a volatile memory device for processing by the CPU 802.

According to an example implementation, the computing device architecture 800 includes a read-only memory (ROM) 820 where invariant low-level system code or data for basic system functions such as basic input and output (I/O), startup, or reception of keystrokes from a keyboard are stored in a non-volatile memory device. According to an example implementation, the computing device architecture 800 includes a storage medium 822 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 824, application programs 826 (including, for example, a web browser application, a widget or gadget engine, and or other applications, as necessary) and data files 828 are stored. According to an example implementation, the computing device architecture 800 includes a power source 830 that provides an appropriate alternating current (AC) or direct current (DC) to power components.

According to an example implementation, the computing device architecture 800 includes and a telephony subsystem 832 that allows the device 800 to transmit and receive sound over a telephone network. The constituent devices and the CPU 802 communicate with each other over a bus 834.

According to an example implementation, the CPU 802 has appropriate structure to be a computer processor. In one arrangement, the CPU 802 may include more than one processing unit. The RAM 818 interfaces with the computer bus 834 to provide quick RAM storage to the CPU 802 during the execution of software programs such as the operating system application programs, and device drivers. More specifically, the CPU 802 loads computer-executable process steps from the storage medium 822 or other media into a field of the RAM 818 in order to execute software programs. Data may be stored in the RAM 818, where the data may be accessed by the computer CPU 802 during execution. In one example configuration, the device architecture 800 includes at least 88 MB of RAM, and 256 MB of flash memory.

The storage medium 822 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual inline memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 822, which may include a machine-readable storage medium.

According to one example implementation, the term computing device, as used herein, may be a CPU, or conceptualized as a CPU (for example, the CPU 802 of FIG. 8). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

While certain implementations of the disclosed technology have been described throughout the present description and the figures in connection with what is presently considered to be the most practical and various implementations, it is to be understood that the disclosed technology is not to be limited to the disclosed implementations, but on the contrary, is intended to cover various modifications and equivalent arrangements included within the scope of the appended claims and their equivalents. Although specific terms are employed herein, they are used in a generic and descriptive sense only and not for purposes of limitation.

In the foregoing description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementation," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms should be construed to take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a-given sequence, either temporally, spatially, in ranking, or in any other manner.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims and their equivalents.

An embodiment of the present disclosure may be implemented according to at least the following:

Clause 1: A barrier device comprising: at least one outlet disposed on a surface; and at least one inlet disposed on the surface.

Clause 2: The device of Clause 1 including a plurality of outlets disposed on a surface; and a plurality of inlets dispersed among the plurality of outlets and disposed on the surface.

Clause 3: The device of Clauses 1 or 2 further including at least one pump in fluid communication with the at least one outlet and the at least one inlet.

Clause 4: The device of Clause 3 wherein the at least one pump is configured to simultaneously pump an operating fluid out of the plurality of outlets and pull the operating fluid back through the plurality of inlets to create a hydrodynamic barrier on the surface.

Clause 5: The device of Clauses 1 or 2 further including an energy harvesting device configured to draw energy from a relative movement the surface to a surrounding environment to circulate an operating fluid out of the at least one outlet and pull the operating fluid back through the at least one inlet.

Clause 6: A barrier device comprising a plurality of pores (e.g., outlets and/or inlets) disposed on a surface; and at least one pump in fluid communication with the plurality of pores, the at least one pump configured to rapidly switch between pumping an operating fluid out of the plurality of pores and pulling the operating fluid back through the plurality of pores to maintain a barrier of the operating fluid on the surface.

Clause 7: The device of any of Clauses 4-6 further comprising at least one reservoir configured to store at least a portion of the operating fluid.

Clause 8: The device of any of Clauses 4-7, wherein the operating fluid comprises air, and the barrier comprises air bubbles.

Clause 9: The device of any of Clauses 3, 4, and 6-8 further comprising a controller configured to control the pump to operate in accordance with at least one of a plurality of operating modes.

Clause 10: The device of Clause 9, wherein the plurality of operating modes comprises at least one of: an antifouling mode configured to maintain substantial equivalence between a flow rate of the operating fluid through the plurality of outlets and a flow rate the operating fluid through of the plurality of inlets; an injection mode configured to maintain the flow rate of the operating fluid through the plurality of outlets as greater than the flow rate of the operating fluid through the plurality of inlets such that a portion of the operating fluid is released into a surrounding environment; a sampling mode configured to maintain the flow rate of the operating fluid through the plurality of outlets as lesser than the flow rate of the operating fluid through the plurality of inlets such that a portion of environmental fluid is withdrawn from the surrounding environment into the plurality of inlets; and a switching mode configured to modify at least one of the flow rate of the operating fluid through the plurality of outlets and the flow rate of the operating fluid through the plurality of inlets over time.

Clause 11: The device of Clause 10, wherein the switching mode is configured to switch between the injection mode and the sampling mode.

Clause 12: The device of any of Clauses 4-11, wherein the operating fluid comprises at least one of an emissible fluid, hydrophobic fluid, micro-beads, metallic filings, magnetic material, sterile solutions, solvents, and cleaning solutions.

Clause 13: The device of any of clauses 1-12, wherein the at least one outlet comprises outlet hole array disposed on the surface, and the at least one inlet comprises an inlet hole array disposed on the surface and offset from the outlet hole array.

Clause 14: The device of any of clauses 1-13, wherein the at least one outlet comprises at least one substantially rectangular outlet trench disposed on the surface, and the at least one inlet comprises at least one substantially rectangular inlet trench disposed on the surface, the inlet trenches and the outlet trenches being disposed in an alternating pattern.

Clause 15: The device of any of clauses 1-14, wherein the at least one outlet comprises at least one substantially trapezoidal outlet trench disposed on the surface, and the at least one inlet comprises at least one substantially trapezoidal inlet trench disposed on the surface, the inlet trenches and the outlet trenches being disposed in an alternating pattern.

Clause 16: The device of any of clauses 1-15, further comprising at least one microneedle disposed on the surface.

Clause 17: The device of clause 16, wherein the at least one outlet and the at least one inlet are formed in the at least one microneedle.

Clause 18: The device of clauses 16 or 17, wherein the at least one microneedle is substantially conical.

Clause 19: The device of any of clauses 16-18, wherein each of the at least one microneedle comprises a plurality of outlets and a plurality of inlets.

Clause 20: The device of any of clauses 3, 4, and 6-19, wherein the at least one pump comprises at least one of a peristaltic pump, a syringe pump, and a pneumatic pump.

Clause 21: The device of any of clauses 3-20, wherein the operating fluid is acquired from an environment surrounding the surface.

Clause 22: The device of any of clauses 1-21, wherein at least one outlet and/or at least one inlet comprise pores in a porous material disposed on the surface.

Clause 23: The device of clause 22, wherein the porous material comprises a hydrogel.

Clause 24: The device of any of clauses 1-23, wherein each of the plurality of outlets is surrounded by a plurality of the plurality of inlets.

Clause 25: The device of any of clauses 3-24, wherein the hydrodynamic barrier and/or barrier locally changes surface characteristics of the surface.

Clause 26: The device of clause 25, wherein the surface characteristic comprises an apparent friction with a surrounding environment.

Clause 27: The device of any of clauses 1-26 disposed on a vehicle, ship, or aircraft.

Clause 28: The device of any of clauses 3, 4, and 6-27 configured to clean the surface by the movement of the operating fluid.

Clause 29: The device of any of clauses 1-28 wherein outlets and/or inlets disposed on an edge are angled towards a center of the surface.

Clause 30: The device of any of clauses 1-29 wherein outlets and/or inlets disposed on an edge are distinguishable by at least one of change in geometry and relatively reduced spacing to neighboring outlets/inlets.

Clause 31: A method comprising: outputting, through at least one outlet disposed on a surface, on operating fluid; and withdrawing, through at least one inlet disposed on the surface, the operating fluid.

Clause 32: The method of clause 31 including outputting through a plurality of outlets disposed on a surface; and withdrawing, through a plurality of inlets dispersed among the plurality of outlets and disposed on the surface.

Clause 33: The method of Clauses 31 or 32, wherein the outputting and withdrawing is substantially simultaneous.

Clause 34: The method of Clauses 31-33, wherein the outputting and withdrawing create a barrier on the surface with the operating fluid.

Clause 35: The method of Clauses 31-34, wherein the outputting and withdrawing create a hydrodynamic barrier on the surface with the movement of the operating fluid.

Clause 36: The method of Clauses 31-35 further comprising: harvesting energy from a relative movement the surface to a surrounding environment to drive the outputting and withdrawing.

Clause 37: The method of Clauses 31-36, wherein the outputting and withdrawing maintain a barrier of the operating fluid on the surface.

Clause 38: The method of Clauses 31-37 further comprising selecting an operating fluid from a plurality of operating fluids, the plurality of operating fluids comprising one or more of an emissible fluid, hydrophobic fluid, micro-beads, metallic filings, magnetic material, sterile solutions, solvents, and cleaning solutions; and outputting the selected operating fluid.

Clause 39: The method of any of Clauses 31-38, wherein the operating fluid comprises air, and the barrier comprises air bubbles.

Clause 40: The method of Clauses 31-39 further comprising selecting an operating mode from among the plurality of operating modes; and maintaining relative flow rates between the plurality of outlets and the plurality of inlets based on the selected operating mode.

Clause 41: The method of Clause 40, wherein the plurality of operating modes comprises at least one of: an antifouling mode comprising maintaining substantial equivalence between a flow rate of the operating fluid through the plurality of outlets and a flow rate of the operating fluid through the plurality of inlets; an injection mode comprising maintaining the flow rate of the operating fluid through the plurality of outlets as greater than the flow rate of the operating fluid through the plurality of inlets such that apportion of the operating fluid is released into a surrounding environment; a sampling mode comprising maintaining the flow rate of the operating fluid through the plurality of outlets as lesser than the flow rate of the operating fluid through the plurality of inlets such that a portion of environmental fluid is withdrawn from the surrounding environment; and a switching mode configured to modify at least one of the flow rate of the operating fluid through the plurality of outlets and the flow rate of the operating fluid through the plurality of inlets over time.

Clause 42: The method of Clause 41, wherein the switching mode is configured to switch between the injection mode and the sampling mode.

Clause 43: The method of any of Clauses 31-42, wherein the operating fluid comprises at least one of an emissible fluid, hydrophobic fluid, micro-beads, metallic filings, magnetic material, sterile solutions, solvents, and cleaning solutions.

Clause 44: The method of any of Clauses 31-43, further comprising cleaning the surface by altering at least one of an operating fluid, a flow rate of the plurality of outlets, and a flow rate of the plurality of inlets.

Clause 45: The method of any of clauses 31-44, wherein the at least one outlet comprises an outlet hole array disposed on the surface, and the at least one inlet comprises an inlet hole array disposed on the surface and offset from the outlet hole array.

Clause 46: The method of any of clauses 31-45, wherein the at least one outlet comprises a plurality of outlet trenches disposed on the surface, the at least one inlet comprises a plurality of inlet trenches disposed on the surface, the inlet trenches and the outlet trenches being disposed in an alternating pattern, and the plurality of outlet trenches and the plurality of inlet trenches are substantially rectangular or substantial trapezoidal.

Clause 48: The method of any of clauses 1-15, wherein the at least one outlet and the at least one inlet are formed in a plurality of microneedles disposed on the surface.

Clause 49: The device of clauses 48, wherein the at least one microneedle is substantially conical.

Clause 50: The device of clauses 48 or 49, wherein each of the at least one microneedle comprises a plurality of outlets and a plurality of inlets.

Clause 51: The method of any of clauses 31-50 further comprising acquiring the operating fluid from an environment surrounding the surface.

Clause 52: The method of any of clauses 31-51, wherein at least one outlet and/or at least one inlet comprises pores in a porous material disposed on the surface.

Clause 53: The method of clause 52, wherein the porous material comprises a hydrogel.

Clause 54: The method of any of clauses 31-53, wherein the barrier locally changes surface characteristics of the surface.

Clause 55: The device of clause 54, wherein the surface characteristic comprises an apparent friction with a surrounding environment.

Clause 56: The method of any of clauses 31-55 performed on a surface of a vehicle, ship, or aircraft.

Clause 57: The method of any of clauses 31-56 further comprising cleaning the surface by the movement of the operating fluid.

What is claimed is:

1. A hydrodynamic barrier device comprising:

microneedles disposed on a surface;

outlets formed in the microneedles;

inlets dispersed among the outlets and formed in the microneedles; and a pump assembly in fluid communication with at least a portion of the outlets and at least a portion of the inlets;

wherein the pump assembly is configured to form a surface-sustained hydrodynamic barrier confined on the surface by simultaneously pumping an operating fluid out of at least a portion of the outlets and pulling the operating fluid back through at least a portion of the inlets.

2. The hydrodynamic barrier device of claim 1 further comprising a reservoir configured to store at least a portion of the operating fluid.

3. The hydrodynamic barrier device of claim 1 further comprising a controller configured to operate the pump assembly in operating modes;

wherein the controller is further configured to switch the pump assembly between at least two operating modes comprising:

an injection mode configured to maintain an outlet flow rate of the operating fluid through the outlets as greater than an inlet flow rate of the operating fluid through the inlets such that at least a portion of the operating fluid is released into a surrounding environment; and a sampling mode configured to maintain the outlet flow rate as lesser than the inlet flow rate such that at least a portion of environmental fluid is withdrawn from the surrounding environment into at least a portion of the inlets.

4. The hydrodynamic barrier device of claim 3, wherein the operating fluid comprises at least one of a hydrophobic fluid, micro-beads, metallic filings, magnetic material, sterile solutions, solvents, and cleaning solutions.

5. The hydrodynamic barrier device of claim 1, wherein at least a portion of the microneedles are substantially conical in shape.

6. The hydrodynamic barrier device of claim 1, wherein at least a portion of the microneedles have a height of 800 μm.

7. The hydrodynamic barrier device of claim 1, wherein the pump assembly is selected from the group consisting of a single peristaltic pump capable of simultaneously pumping the operating fluid out of the outlets and pulling the operating fluid back through the inlets, two or more pumps that together perform the simultaneously pumping wherein at least one pump is capable of pumping the operating fluid out of the outlets and at least another pump is capable of pulling the operating fluid back through the inlets, two or more syringe pumps, and two or more pneumatic pumps.

8. A hydrodynamic barrier device comprising:

outlets disposed on a surface;

inlets dispersed among the outlets and disposed on the surface;

at least one pump in fluid communication with at least a portion of the outlets and at least a portion of the inlets;

wherein the at least one pump is configured to form a hydrodynamic barrier on the surface by simultaneously pumping an operating fluid out of at least a portion of the outlets and pulling the operating fluid back through at least a portion of the inlets; and wherein at least a portion of the outlets, at least a portion of the inlets, or both portions of the outlets and the inlets comprise pores in a hydrogel disposed on the surface.

* * * * *